(12) United States Patent
Dong et al.

(10) Patent No.: US 11,530,303 B2
(45) Date of Patent: Dec. 20, 2022

(54) PEROVSKITE-POLYMER COMPOSITES AND METHODS

(71) Applicant: UNIVERSITY OF CENTRAL FLORIDA RESEARCH FOUNDATION, INC., Orlando, FL (US)

(72) Inventors: Yajie Dong, Winter Springs, FL (US); Shin-Tson Wu, Oviedo, FL (US); Caicai Zhang, Orlando, FL (US); Ziqian He, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 134 days.

(21) Appl. No.: 16/943,451

(22) Filed: Jul. 30, 2020

(65) Prior Publication Data
US 2021/0122887 A1 Apr. 29, 2021

Related U.S. Application Data

(63) Continuation-in-part of application No. 15/204,171, filed on Jul. 7, 2016, now Pat. No. 10,907,092.

(51) Int. Cl.
*C09K 11/06* (2006.01)
*C08K 5/56* (2006.01)
(Continued)

(52) U.S. Cl.
CPC .............. *C08J 3/203* (2013.01); *C08K 3/16* (2013.01); *C09K 11/665* (2013.01);
(Continued)

(58) Field of Classification Search
CPC . C09K 11/06; C09K 2211/10; C09K 2211/14; C09K 2211/1425; C09K 2211/145; C08K 5/56
See application file for complete search history.

(56) References Cited

U.S. PATENT DOCUMENTS

| 4,983,573 | A | * | 1/1991 | Bolt | ..................... C04B 35/6365 |
| | | | | | 264/29.4 |
| 10,907,092 | B2 | * | 2/2021 | Dong | ....................... C08K 5/56 |

(Continued)

FOREIGN PATENT DOCUMENTS

| WO | 2013078245 A1 | 5/2013 |
| WO | 2018009530 | 1/2018 |

OTHER PUBLICATIONS

Bai, Young, et al., High performance inverted structure perovskite solar cells based on a PCBM:polystyrene blend electron transport layer. Chem. Mater.3, 9098-9102 (2015).
(Continued)

*Primary Examiner* — Matthew E. Hoban
*Assistant Examiner* — Lynne Edmondson
(74) *Attorney, Agent, or Firm* — Timothy H. Van Dyke; Wolter, Van Dyke, Davis, PLLC

(57) ABSTRACT

Perovskite-polymer composites including perovskite nanocrystals dispersed in a polymer matrix, wherein the perovskite nanocrystals have an average size of from about nm to about 20 nm. Methods for producing a perovskite-polymer composites that may include contacting a solid material comprising a polymer matrix with a solution comprising a perovskite precursor; allowing the solution to penetrate the solid material to yield a swollen solid material comprising the perovskite precursor dispersed within the polymer matrix; optionally contacting the swollen solid material with an antisolvent; and annealing the swollen solid material to crystallize the perovskite precursor and to yield the perovskite-polymer composite comprising perovskite nanocrystals dispersed in the polymer matrix.

25 Claims, 21 Drawing Sheets

(51) Int. Cl.
   *C08J 3/20* (2006.01)
   *C09K 11/66* (2006.01)
   *C08K 3/16* (2006.01)

(52) U.S. Cl.
   CPC ........ *C08J 2333/12* (2013.01); *C08J 2367/03* (2013.01); *C08J 2383/04* (2013.01); *C08K 2201/011* (2013.01)

(56) References Cited

U.S. PATENT DOCUMENTS

| | | | |
|---|---|---|---|
| 2007/0031322 A1* | 2/2007 | Edwards | C04B 35/016 977/896 |
| 2011/0199887 A1 | 8/2011 | Duerig | |
| 2018/0010039 A1 | 1/2018 | Dong et al. | |

OTHER PUBLICATIONS

Berry, J. et al. Hybrid organic-inorganic perovskites (HOIPs): opportunities and challenges. Adv. Mater. 27, 5102-5112 (2015).
Chen, J. et al. Quantum Dots: Optimizing LCD Systems to Achieve Rec. 2020 Color Performance, SID Symp. Dig. Tech. Pap. 46, 173-175 (2015).
Cho, H. et al. Overcoming the electroluminescence efficiency limitations of perovskite light-emitting diodes. Science 350, 1222-1225 (2015).
Conings, B. et al. Intrinsic thermal instability of methylammonium lead trihalide perovskite. Adv. Energy Mater. 5, 1-8 (2015).
DeQuilettes, D. W. et al. Impact of microstructure on local carrier lifetime in perovskite solar cells. Science 348, 683-686, (2015).
Di, Dawei, et al. Size-dependent photon emission from organometal halide perovskite nanocrystals embedded in an organic matrix. J. Phys. Chem. Lett. 6 446-450 (2015).
Dong, Y., et al. Emerging solution-processable luminescent nanomaterials in hybrid structures offer new solutions for displays and lighting. Info. Display 6-14 (2017).
Dong, Y. Invited Paper: solution processable luminescent nanomaterials for display, lighting and beyond. Research Gate 1-3 (2017).
Erman, B. & Flory, P. Critical phenomena and transitions in swollen polymer networks and in linear macromolecules. Macromolecules 19, 2342-2353 (1986).
Green, M. A., Ho-Baillie, A. & Snaith, H. J. The emergence of perovskite solar cells. Nature Photon. 8, 506-514 (2014).
Guarnera, S. et al. Improving the long-term stability of perovskite solar cells with a porous Al2O3 buffer layer. J. Phys. Chem. Lett. 6, 432-437 (2015).
Gou, Y. et al. Air-Stable and Solution-Processable perovskite photodetectors for solar-blind UV and visible light. Research Gate. 1-4 (2015).
Habisreutinger, S. N. et al. Carbon nanotube/polymer composites as a highly stable hole collection layer in perovskite solar cells. Nano lett. 14, 5561-5568 (2014).
Hauff, V. E., Lira Cantu, M., Brown, T. M. & Hoppe, H. Emerging Thin film photovoltaics: stabilize or perish. Adv. Energy Mater. 5 (2015).
Jeon, N. et al. Solvent engineering for high-performance inoragnic-organic hybrid perovskite solar cells. Nature Mater. 13, 897-903 (2014).
Kaman, O. et al. Silica encapsulated manganese perovskite nanoparticles for magnetically induced hyperthermia without. Nanotechnology. 1-10 (2009).
Lee, M., Teuscher, J., Miyasaka, T., Murakami, T. & Snaith, H. Organometal halide perovskites efficient hybrid solar cells based on meso-superstructure Science 338, 643-647 (2012).
Leijtens, T. et al. Stability of metal halide perovskite solar cells. Adv.Energy Mater. 5 (2015).
Li, M., et al. Microencapsulation by solvent exaporation: state of the art for process engineering approaches. Internal. Journ. Pharm. 363, 26-39 (2008).

Longo, G., Pertegás, A., Martínez-Sarti, L., Sessolo, M. & Bolink, H. J. Highly luminescent perovskite-aluminum oxide composites. J. Mater. Chem. C 3, 11286-11289 (2015).
Loo, L. & Patel, P. Perovskite photovoltaics: David Mitzi addresses the promises and challenges. MRS Bull. 40, 636-637 (2015).
Luo, Z., Xu, D. & Wu, S.-T. Emerging quantum-dots-enhanced LCDs. J. Display Technol. 10, 987-990 (2014).
Marion, Ingle. Permeability properties of plastics and elastomers. Mater. World. 52 (2012).
Masi, S., et al. Growing perovskite into polymers for easy-processable optoelctronic devices. Scien. Reports 1-7 (2015).
Pathak, S. et al. Perovskite crystals for tunable white light emission. Chem.Mater. 27, 8066-8075 (2015).
Schmidt, L. C. et al. Nontemplate synthesis of $CH_3NH_3PbBr_3$ perovskite nanoparticles. J. Am. Chem. Soc. 136, 850-853 (2014).
Sheng, R. et al. Photoluminescence characterisations of a dynamic aging process of organic-inorganic $CH_3NH_3PbBr_3$ perovskite. Nanoscale 8, 1926-1931 (2016).
Shi, D. et al. Low trap-state density and long carrier diffusion in organolead trihalide perovskite single crystals. Science 347, 519-522 (2015).
Steckel, J. S. et al. Quantum dots: The ultimate down-conversion material for LCD displays. J. Soc. Inf. Display 23, 294-305 (2015).
Stranks, S. D. & Snaith, H. J. Metal-halide perovskites for photovoltaic and light-emitting devices. Nature Nanotech. 10, 391-402 (2015).
Tan, Z.-K. et al. Bright light-emitting diodes based on organometal halide perovskite. Nature Nanotech. 9, 687-692 (2014).
Wang, Y. et al. Ultrastable highly luminescent organic-inorganic perovskite-polymer composite films. Materials Views. 28, 10710-10717 (2016).
Xing, G. et al. Low-temperature solution-processed wavelength-tunable perovskites for lasing. Nature. Mater. 13, 476-480 (2014).
Yang, W. S. et al. High-performance photovoltaic perovskite layers fabricated through intramolecular exchange. Science 348, 1234-1237 (2015).
You, J., et al. Moisture assisted perovskite film growth for high performance solar cells. App. Phys. Lett. 105, 1-5 (2014).
Zhang, F. et al. Brightly luminescent and color-tunable colloidal $CH_3NH_3PbX_3$ (X= Br, I, Cl) quantum dots: potential alternatives for display technology. ACS nano 9, 4533-4542 (2015).
Zhu, F. et al. Shape evolution and single particle luminescence of organometal halide perovskite nanocrystais. ACS Nano 9, 2948-2959 (2015).
Zhu, R., Luo, Z., Chen, H., Dong, Y. & Wu, S.-T. Realizing Rec. 2020 color gamut with quantum dot displays. Optics express 23, 23680-23693 (2015).
International Search Report and Written Opinion for PCT Application PCT/US17/040702 dated Dec. 26, 2017, pp. 1-13.
Martinez_Sarti et al., "efficient photoluminescent thin films consisting of hybrid perovskite nanoparticles", Chem. Commun., 52, pp. 11351-11354, year 2016.
Choi et al., "Cesium-doped methylammonium lead iodide perovskite light absorber for hybrid solar cells", May 5, 2014, Nano Energy, vol. 7, pp. 80-85.
Protesescu, et al., "Nanocrystais of Cesium Lead Halide Perovskites (csPbX3, X=Vl, Br and I):, Novel Optoelectronic Materials Showing Bright Emission with Wide Color Gamut", Jan. 29, 2018, Nanoletters, 15 pp. 3692-3696.
Goff et al., "Supporting information For Effect of Solvent-Induced Swelling on Exciton in Conjugated Ploymer Nanoparticles", Mar. 15, 2017, J. Phys. Chem. C, 121, pp. 7549-7557.
Kulbak et al., "Cesium Enhances Long-Term Stability of Lead Bromine Perovskite Solar Cells", The Journal of Physical Chemistry Letters, pp. 161-171, year 2015.
Ren et al., "Thermal Assisted Oxygen Annealing for High Efficiency Planar Ch3NH3PbI3 Perovskite Solar Cells", Scientific Reports, 4:6752, pp. 1-6, Year 2014.

\* cited by examiner

FIG. 1A
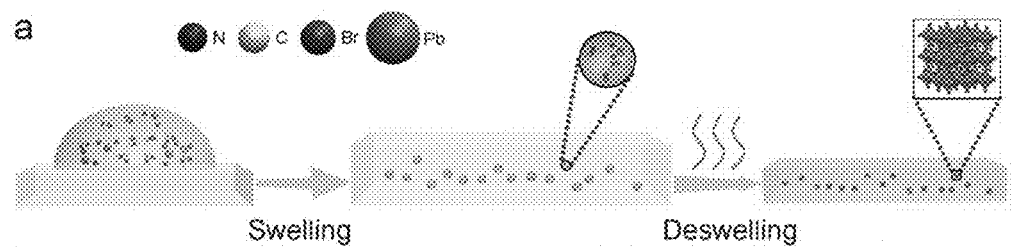
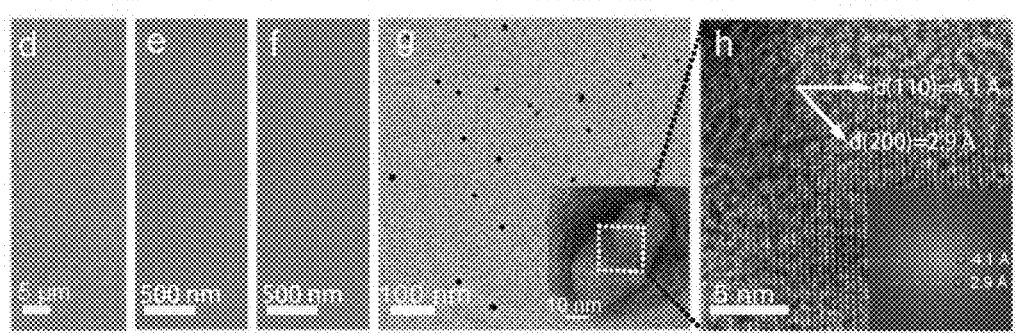
FIG. 1D   FIG. 1E   FIG. 1F   FIG. 1G   FIG. 1H

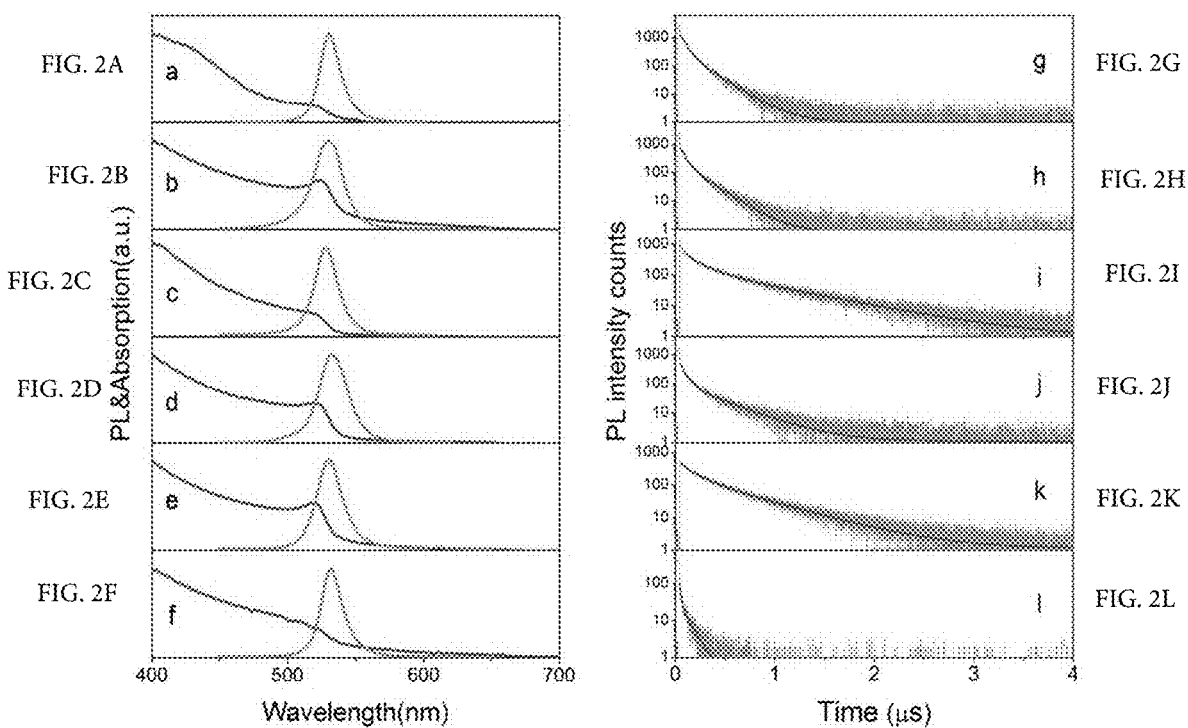

FIG. 3A
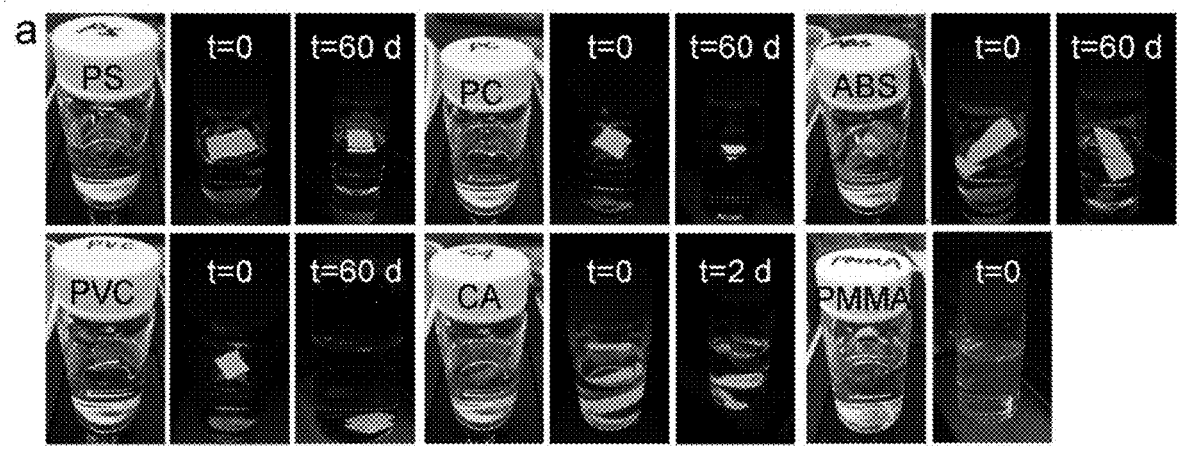
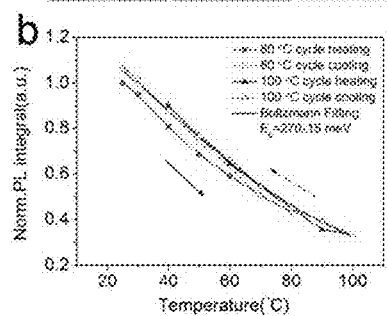
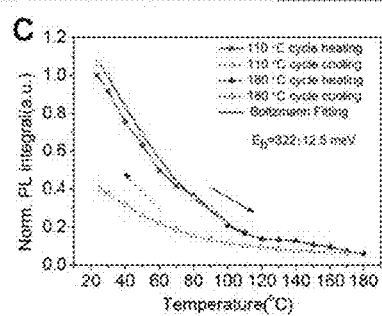
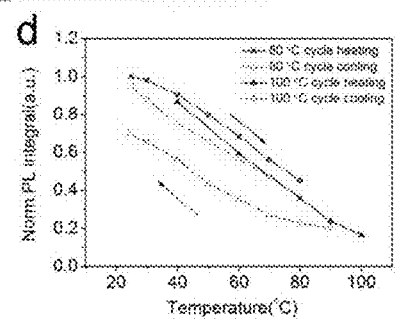
FIG. 3B           FIG. 3C           FIG. 3D FIG. 4A
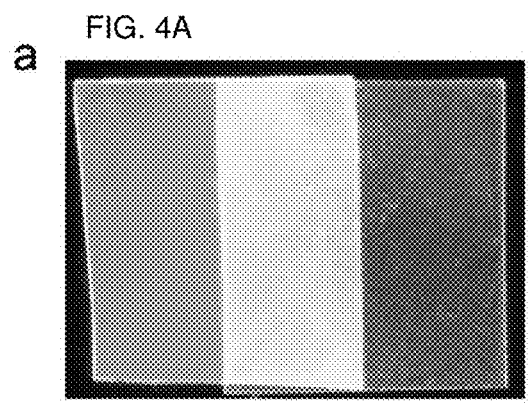
FIG. 4B
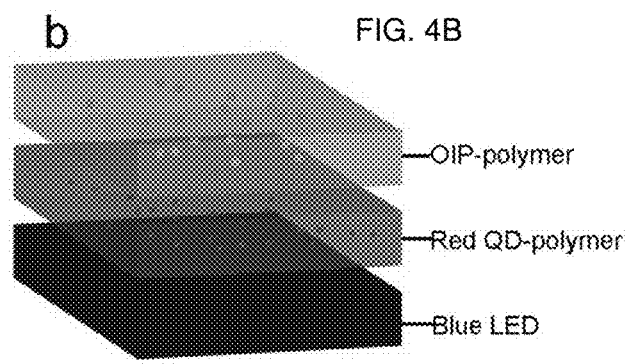
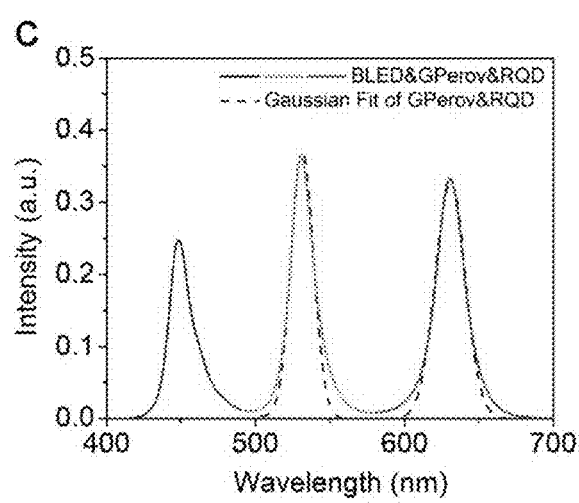
FIG. 4C
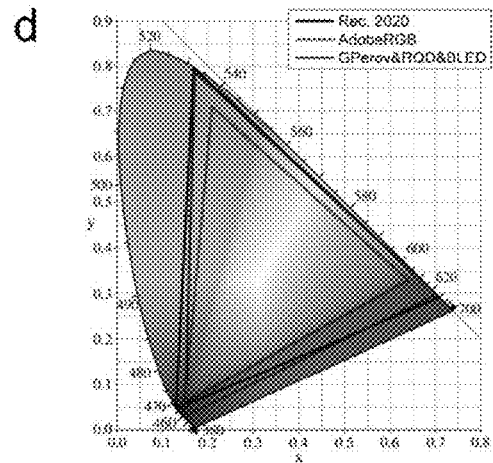
FIG. 4D FIG. 5A 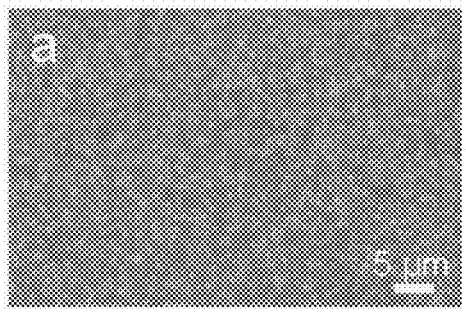 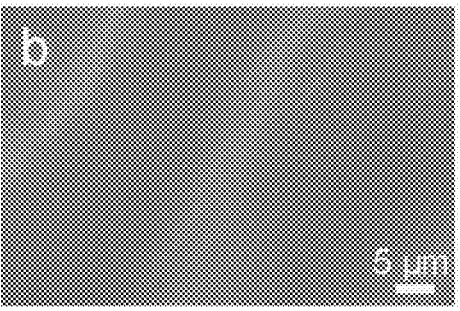 FIG. 5B
FIG. 5C 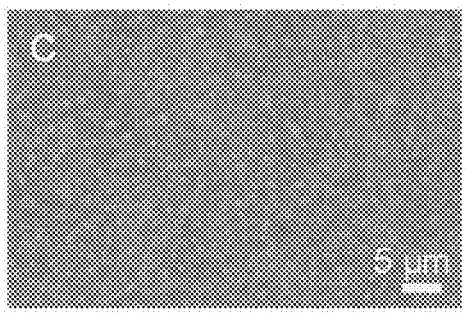 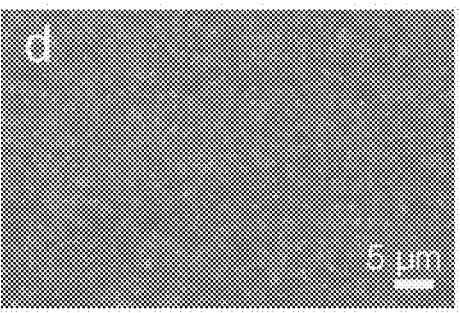 FIG. 5D

| Element | Weight [%] | Atomic [%] | Uncert. [%] | Correction | K-Factor |
|---|---|---|---|---|---|
| Br | 51.83 | 73.61 | 2.34 | 0.99 | 2.432 |
| Pb | 48.16 | 26.38 | 2.79 | 0.99 | 4.409 | a b

FWHM    Peak wavelength
FIG. 8A
a
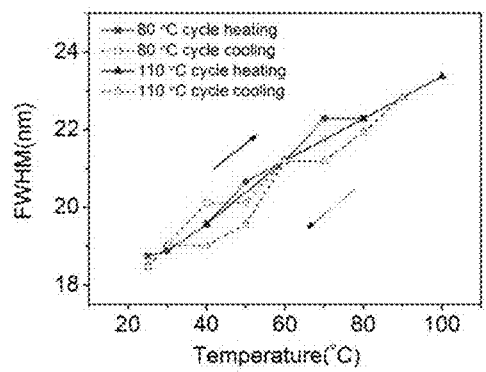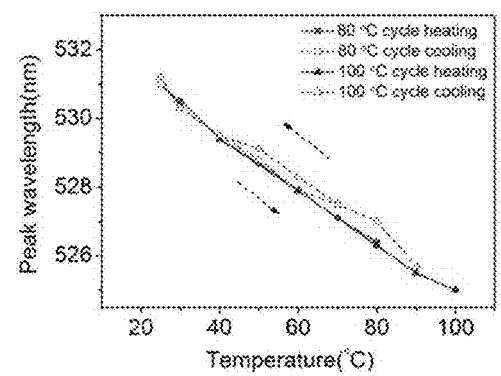
FIG. 8B
b
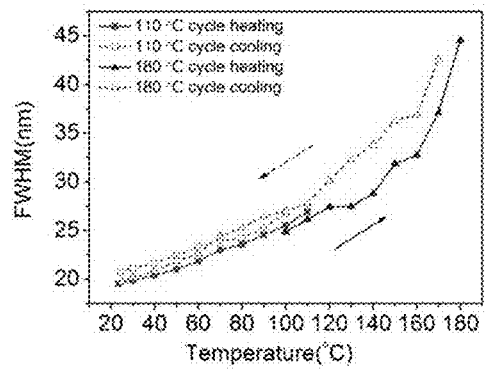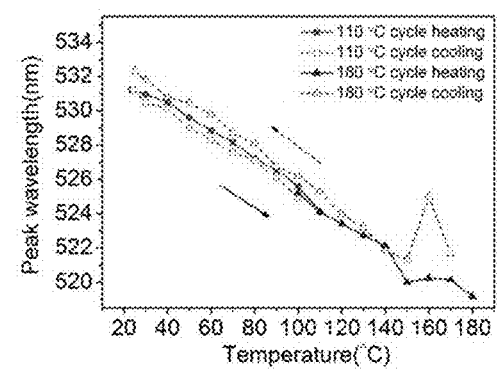
FIG. 8C
c
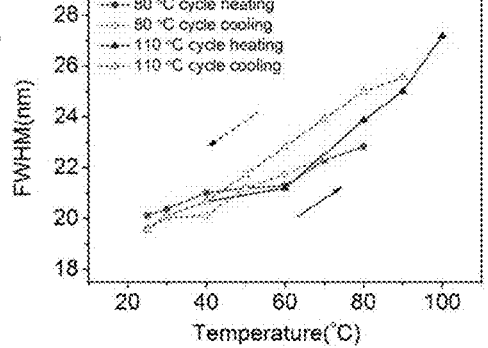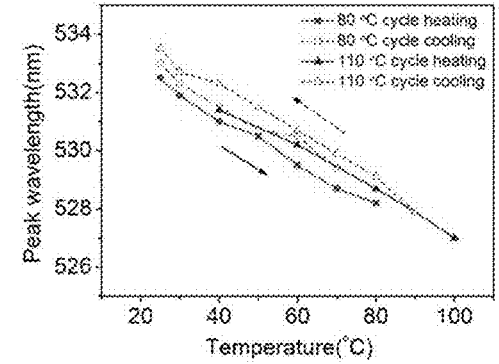

PEROVSKITE-POLYMER COMPOSITES AND METHODS

CROSS-REFERENCE TO RELATED APPLICATION

This application is a Continuation-In-Part of and claims the benefit of U.S. patent application Ser. No. 15/204,171, filed Jul. 7, 2016, titled METHODS OF MAKING HIGHLY STABLE PEROVSKITE-POLYMER COMPOSITES AND STRUCTURES USING SAME, which is incorporated by reference herein in its entirety.

BACKGROUND

Global demand for displays providing a large color gamut is increasing. Traditional phosphor converted-white light-emitting diodes (LEDs) cannot fulfill the demand for highly vivid colors. Additionally, the National Television Standards Committee (NTSC) has gradually upgraded the color gamut evaluation metric from standard Red Green Blue (sRGB) to Rec. 2020, which requires highly vivid colors. This action by the NTSC renders the demand for displays capable of providing a large color gamut urgent. Nevertheless, the need for displays providing a large color gamut remains largely unmet.

New energy saving requirements for solid-state lighting (SSL) systems has made it increasingly important to be able to tailor the spectra of those SSL systems. A need exists for tailoring the spectra of SSL systems according to the demands of different applications to maximize the effectiveness of the lighting. A need exists for SSL systems that can ensure the presence of necessary components of the spectrum for specific lighting requirements while at the same time reducing or omitting unnecessary or even damaging portions of the spectrum.

Cost is always a factor when developing such displays and SSL systems. A need, therefore, exists not only for improved products but also for improved manufacturing techniques.

The discussion of shortcomings and needs existing in the field prior to the present invention is in no way an admission that such shortcomings and needs were recognized by those skilled in the art prior to the present disclosure.

BRIEF SUMMARY

Various embodiments relate to perovskite-polymer composites that include perovskite nanocrystals dispersed in a polymer matrix. Various embodiments relate to methods for producing such perovskite-polymer composites. The methods may include contacting a solid material comprising a polymer matrix with a solution comprising a perovskite precursor; allowing the solution to penetrate the solid material to yield a swollen solid material comprising the perovskite precursor dispersed within the polymer matrix; optionally contacting the swollen solid material with an antisolvent; and annealing the swollen solid material to crystallize the perovskite precursor and to yield the perovskite-polymer composite comprising perovskite nanocrystals dispersed in the polymer matrix.

These and other features, aspects, and advantages of various embodiments will become better understood with reference to the following description, figures, and claims.

BRIEF DESCRIPTION OF THE FIGURES

Many aspects of this disclosure can be better understood with reference to the following figures.

FIG. 1A-1H. Swelling-deswelling microencapsulation strategy to perovskite-polymer composites. FIG. 1A is a schematic illustrating a $MAPbBr_3$-polymer composite formation process through swelling-deswelling. FIG. 1B-1C show images of the luminescent composite samples prepared by cotton swab painting (FIG. 1B) or spin coating (FIG. 1C) under UV excitation (365 nm). Samples from left to right are $MAPbBr_3$—PS, $MAPbBr_3$—PC, $MAPbBr_3$-ABS, $MAPbBr_3$—CA, $MAPbBr_3$—PVC and $MAPbBr_3$—PMMA respectively. In FIG. 1D, fluorescent optical microscope images of $MAPbBr_3$—PS composite with focal plane ~4 μm underneath the top surface are shown. FIG. 1E-1F illustrate scanning electron microscopy (SEM) images of a PS surface before (FIG. 1E) and after (FIG. 1F) $MAPbBr_3$ spin coating and substrate annealing processing. In FIG. 1G, a cross-section transmission electron microscopy (TEM) image of $MAPbBr_3$—PS composites showing well dispersed $MAPbBr_3$ nanoparticles embedded in PS is shown. Inset: HRTEM of single $MAPbBr_3$ nanoparticle. In FIG. 1H, HRTEM of highlighted area as in FIG. 1G, Inset: fast Fourier transform (FFT) of FIG. 1H.

FIG. 2A-2L. Optical properties for $MAPbBr_3$-polymer composites. In FIG. 2A-2F, UV-Vis absorption (red) and PL emission (green) spectra are shown. In FIG. 2G-2L, PL decay (green) and fitting curves (red) for excitation at 467 nm and emission at ~530 nm of various $MAPbBr_3$-polymer composites are illustrated. The samples from top to bottom are $MAPbBr_3$—PS (FIG. 2A, FIG. 2G), $MAPbBr_3$—PC (FIG. 2B, FIG. 2H), $MAPbBr_3$-ABS (FIG. 2C, 2I), $MAPbBr_3$—CA (FIG. 2D, 2J), $MAPbBr_3$—PVC (FIG. 2E, FIG. 2K) and $MAPbBr_3$—PMMA (FIG. 2F, FIG. 2L).

FIG. 3A-3D. Water and thermal stability characterizations. In FIG. 3A, photographs taken under white light or UV irradiation at indicated time period are shown. The composite samples immersed in water are $CH_3NH_3PbBr_3$—PS, $CH_3NH_3PbBr_3$—PC, $CH_3NH_3PbBr_3$-ABS, $CH_3NH_3PbBr_3$—PVC, $CH_3NH_3PbBr_3$—CA and $CH_3NH_3PbBr_3$—PMMA. In FIG. 3B-3D, temperature-dependent PL intensity of composites $CH_3NH_3PbBr_3$—PS (FIG. 3B), $CH_3NH_3PbBr_3$—PC (FIG. 3C) and $CH_3NH_3PbBr_3$-ABS (FIG. 3D) are shown in representative graphs. Squares mark the first thermal cycle and triangles represent the second thermal cycle. The solid symbols refer to heating stages and open symbols to cooling stages. Black lines in (FIG. 3B) and (FIG. 3C) indicate Boltzmann fittings for the reversible heating, cooling processes.

FIG. 4A-4D. Application of $MAPbBr_3$-Polymer composites as down converters for back light units of wide color gamut displays. FIG. 4A is a photograph of red QD-PC and $MAPbBr_3$—PC composite films under UV illumination. FIG. 4B is a schematic of white light generation by integrating red QD-PC and $MAPbBr_3$—PC films with blue light emitting diodes. FIG. 4C is a graph illustrating emission spectra of a white LED system with green $MAPbBr_3$—PC and red QD-PC films as down converters for blue LEDs. Dash lines refer to gaussian fit for green and red emission spectra. In FIG. 4D, color gamut coverage of the white LED systems (blue) with adobe RGB (gray) and Rec. 2020 (black) standards for comparison in CIE 1931 is shown.

FIG. 5A-5E. Fluorescence optical microscopy images of $MAPbBr_3$-polymer composites. FIG. 5A, $MAPbBr_3$—PC. FIG. 5B, $MAPbBr_3$-ABS. FIG. 5C, $MAPbBr_3$—CA. FIG. 5D, $MAPbBr_3$—PVC. FIG. 5E, $MAPbBr_3$—PMMA. For FIG. 5A-5D, the image focal planes were ~4-5 μm deep underneath the top surface of the samples. For FIG. 5E, the focal plane was on the top surface.

FIG. 6A, PC. FIG. 6B, MAPbBr$_3$—PC. FIG. 6C, ABS. FIG. 6D, MAPbBr$_3$-ABS. FIG. 6E, CA. FIG. 6F, MAPbBr$_3$-CA. FIG. 6G, PVC. FIG. 6H, MAPbBr$_3$—PVC. FIG. 6I, PMMA. FIG. 6J, MAPBBr$_3$—PMMA.

FIG. 7A, EDS spectra were taken from highlighted region of the MAPbBr$_3$—PS composites, and showed the existence of element Pb and Br. FIG. 7B, Table B showing the Pb and Br atomic ratio.

FIG. 8A-8C. Temperature-dependent photoluminescence peak wavelength (left column) and FWHM (right column) of MAPbBr$_3$-polymer composite. FIG. 8A, MAPbBr$_3$—PS. FIG. 8B, MAPbBr$_3$—PC. FIG. 8C, MAPbBr$_3$-ABS. For each figure, squares mark the first thermal cycle and triangles represent the second thermal cycle. The solid symbols refer to heating and open symbols to cooling.

FIG. 9A, MAPbBr$_3$—PS. FIG. 9B, MAPbBr$_3$—PC. FIG. 9C, MAPbBr$_3$-ABS. The red curves were measured when the samples cooled to room temperature from the second thermal cycle.

FIG. 10A, FIG. 10B, Fluorescent optical microscope image of MAPbBr$_3$—PS (FIG. 10A) and MAPbBr$_3$—PC (FIG. 10B) after boiling in water. FIG. 10C, FIG. 10D PL spectra of MAPbBr$_3$—PS (FIG. 10C) and MAPbBr$_3$—PC (FIG. 10D) before and after water boiling. $I_0$ refers to the initial PL peak intensity before water boiling. FIG. 10E, FIG. 10F, UV-Vis spectra of MAPbBr$_3$—PS (FIG. 10E) and MAPbBr$_3$—PC (FIG. 10F) before (green) and after (red) water boiling.

FIG. 11A, MAPbBr$_3$—PS. FIG. 11B, MAPbBr$_3$—PC. FIG. 11C, MAPbBr$_3$-ABS. FIG. 11D, MAPbBr$_3$—CA. FIG. 11E, MAPbBr$_3$—PVC. FIG. 11F, MAPbBr$_3$—PMMA.

DETAILED DESCRIPTION

Introduction and Definitions

Figure 5E:
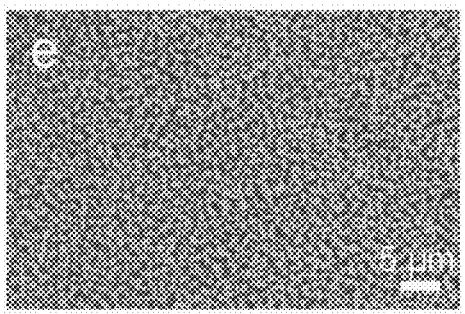

It has been discovered that a series of highly stable, highly luminescent CH$_3$NH$_3$PbBr$_3$ (MAPbBr$_3$)-polymer composites can be fabricated through a swelling-deswelling microencapsulation process. As a result, dispersion and passivation of crystalline perovskite nanoparticles within polymer matrix have been achieved. These composites possess high photoluminescence quantum yield (PLQY), up to 15-65%, high color purity showing full width at half maxima (FWHM) down to 18-25 nm, and long average radiative lifetime ($\tau_{avg}$) up to ~130-502 ns.

The perovskite-polymer composites in the present invention demonstrate water resistance and heat stability. Among them, MAPbBr$_3$-polystyrene (PS) and MAPbBr$_3$-polycarbonate (PC) composites can survive boiling water treatment with minimum degradations. PLQY characterizations after boiling the samples for 30 minutes showed decay of only less than 7% for MAPbBr$_3$—PC and 15% for MAPbBr$_3$—PS composites. Using these green emissive MAPbBr$_3$-polymer composites and red CdSe based quantum dots as down-converters of blue LEDs, high color quality white-light generation were demonstrated, providing color gamut coverage of record high 95% of Rec 2020, the color standard for ultra-high definition (UHD) TVs. This method enables the use of perovskites in various applications as back light down converters for liquid crystal display, and may lead to solution processed highly stable, color pure light emitting devices, lasers or even high efficiency solar photovoltaics.

Various embodiments may be understood more readily by reference to the following detailed description. Unless defined otherwise, all technical and scientific terms used herein have the same meaning as commonly understood by one of ordinary skill in the art to which this disclosure belongs.

As used herein, the term "standard temperature and pressure" generally refers to 25° C. and 1 atmosphere. Standard temperature and pressure may also be referred to as "ambient conditions." Unless indicated otherwise, parts are by weight, temperature is in ° C., and pressure is at or near atmospheric. The terms "elevated temperatures" or "high-temperatures" generally refer to temperatures of at least 100° C.

The term "mol percent" or "mole percent" generally refers to the percentage that the moles of a particular component are of the total moles that are in a mixture. The sum of the mole fractions for each component in a solution is equal to 1.

As used herein, the term "Full width at half maximum" (FWHM) is an expression of the extent of function given by the difference between the two extreme values of the independent variable at which the dependent variable is equal to half of its maximum value.

As used herein, the term "Photoluminescence Quantum Yield" (PLQY) of a material or molecule is defined as the quantity of photons emitted as a fraction of the quantity of photons absorbed.

Unless otherwise defined, all technical and scientific terms used herein are intended to have the same meaning as commonly understood in the art to which this invention pertains and at the time of its filing. Although various methods and materials similar or equivalent to those described herein can be used in the practice or testing of the present invention, suitable methods and materials are described below. However, the skilled should understand that the methods and materials used and described are examples and may not be the only ones suitable for use in the invention. Moreover, it should also be understood that as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary. Hence, where appropriate to the invention and as understood by those of skill in the art, it is proper to describe the various aspects of the invention using approximate or relative terms and terms of degree commonly employed in patent applications, such as: so dimensioned, about, approximately, substantially, essentially, consisting essentially of, comprising, and effective amount.

The term, "perovskite" as used herein, means a crystal structure with the structural formula $ABX_3$, where A, B, and X are organic and inorganic ions, respectively. By replacing the inorganic A cation with an organic cation, an organic-inorganic perovskite (OP) can be formed. In certain embodiments, A is an organic or inorganic cation, B is a metal cation, and X is at least one anion. The cation A may be selected from the organic group consisting of RNH3 where R is unsubstituted or substituted $C_1$-$C_{20}$ alkyl or inorganic group wherein A is Cs+ B may be a divalent metal cation selected from the group consisting of $Ca^{2+}$, $Sr^{2+}$, $Cd^{2+}$, $Cu^{2+}$, $Ni^{2+}$, $Mn^{2+}$, $Fe^{2+}$, $Co^{2+}$, $Pd^{2+}$, $Ge^{2+}$, $Sn^{2+}$, $Pb^{2+}$, $Sn^{2+}$, $Yb^{2+}$, and $Eu^{2}$, preferably $Pb^{2+}$, $Sn^{2+}$, $Ge^{2+}$, more preferably $Pb^{2+}$. X may be one or more different halide anions selected from the group consisting of fluoride ($F^-$), chloride ($Cl^-$), bromide ($Br^-$), iodide ($I^-$), preferably, $Br^-$. The general chemical formula for perovskite compounds is $ABX_3$, where 'A' and 'B' are two cations of very different sizes, and X is an anion that bonds to both. The 'A' atoms are larger than the 'B' atoms.

Figure 16:
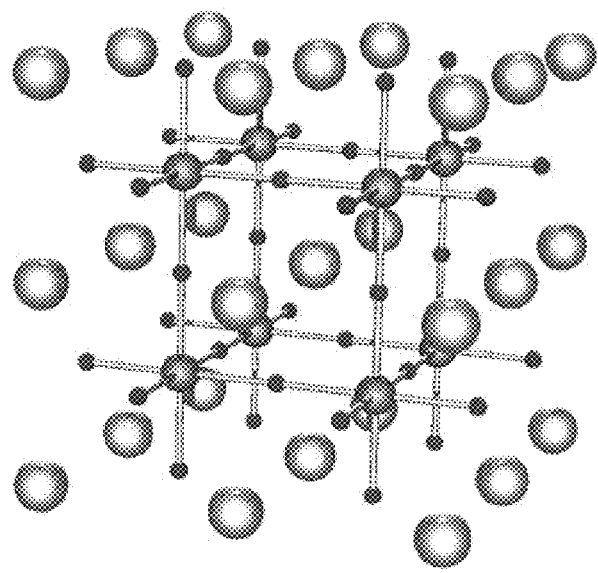
FIG. 16 provides a diagram of perovskite.

(Adapted from Wikipedia) In the perovskite structure shown in FIG. 16, the red spheres are X atoms (usually oxygens), the blue spheres are B-atoms (a smaller metal cation, such as $Ti^{4+}$), and the green spheres are the A-atoms (a larger metal cation, such as $Ca^{2+}$).

In preferred embodiments, methylammonium lead trihalide ($CH_3NH_3PbX_3$, where X is a halogen atom such as iodine, bromine or chlorine), with an optical bandgap between 1.5 and 2.8 eV depending on halide content is used.

Figure 17:
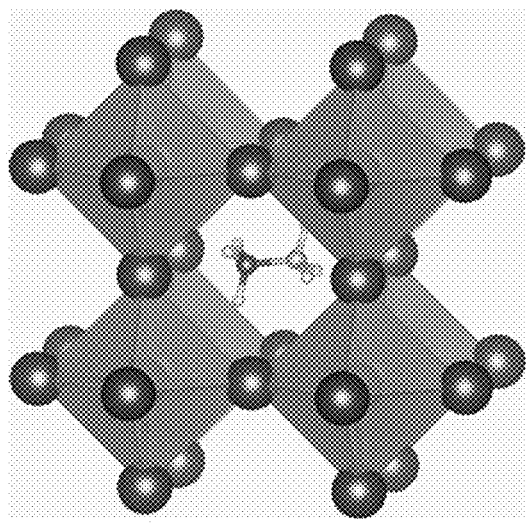
FIG. 17 provides a diagram of the crystal structure of CH$_3$NH$_3$PbX$_3$ perovskites It should be understood that the various embodiments are not limited to the examples illustrated in the figures.

(Adapted from Wikipedia). Crystal structure of $CH_3NH_3PbX_3$ perovskites (X=I, Br and/or Cl) is shown in FIG. 17. The methylammonium cation ($CH_3NH_3^+$) is surrounded by $PbX_6$ octahedra.

The term, "polymer" as used herein, means a large molecule, or macromolecule, composed of many repeated subunits. Polymers, both natural and synthetic, are created via polymerization of many small molecules, known as monomers. Their consequently large molecular mass relative to small molecule compounds produces unique physical properties, including toughness, viscoelasticity, and a tendency to form glasses and semicrystalline structures rather than crystals. In certain embodiments, polymers may be selected from the group consisting of polystyrene (PS), polycarbonate (PC), cellulose acetate (CA), polyvinal chloride (PVC), poly (vinylidene fluoride), (PVDF), polyurene (PU), poly (methyl methacrylate) (PMMA), polyvinyl alcohol (PVA), and polynitriles.

The term, "spin coating" as used herein, means a procedure used to deposit uniform thin films to flat substrates. Usually a small amount of coating material is applied on the center of the substrate, which is either spinning at high or low speed or not spinning at all.

The term "dip coating" as used herein, means immersing of a substrate into a tank containing coating material, removing the piece from the tank, and allowing it to drain. The coated piece can then be dried by force-drying or baking. It is a popular way of creating thin film coated materials along with the spin coating procedure. The dip coating process can be, generally, separated into 3 stages: Immersion: the substrate is immersed in the solution of the coating material at a constant speed preferably judder free Dwell time: the substrate remains fully immersed and motionless to allow for the coating material to apply itself to the substrate Withdrawal: the substrate is withdrawn, again at a constant speed to avoid any judders. The faster the substrate is withdrawn from the tank the thicker the coating material that will be applied to the board.

The term "slot die coating" as used herein, means a technology used to deposit a variety of liquid chemistries onto glass, stainless steel, and plastic substrates. This is achieved through the precise metering the process fluid and dispensing it at a controlled rate while the coating die is precisely moved relative to the substrate.

The term "ink jet coating" is an emerging manufacturing technique in which ink jet technology is used to deposit materials on substrates. The technique aims to eliminate fixed costs of production and reduce the amount of materials used.

The term, "passivation," as used herein, means the use of a light coat of a protective material, such as metal oxide, to create a shell or coating.

The term, "substrate" as used herein, means a substance or layer that underlies something, or on which some process occurs. The term, "polymer substrate" as used herein, means a polymer layer that underlies a perovskite solution.

The term, "solvent" as used herein, means the liquid in which a solute is dissolved to form a solution. In certain embodiments, solvents dissolve perovskites (e.g., dimethylformamide (DMF), dimethyl sulfoxide (DMSO), r-butyrolactone (GBL), acetone, and acetonitrile).

It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by prior disclosure. Further, the dates of publication provided could be different from the actual publication dates that may need to be independently confirmed.

Unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

The examples and embodiments described herein are for illustrative purposes only and that various modifications or changes in light thereof will be suggested to persons skilled in the art and are to be included within the spirit and purview of this application. Many variations and modifications may be made to the above-described embodiment(s) of the disclosure without departing substantially from the spirit and principles of the disclosure. All such modifications and variations are intended to be included herein within the scope of this disclosure.

General Discussion

Various embodiments relate to providing a general method to fabricate stable, highly luminescent perovskite-polymer composites and their application either as optical down-converters or emitters for display and lighting, or as active absorber or passive luminescent concentrators for solar photovoltaics.

The swelling-deswelling encapsulation method involves three components: (i) perovskite precursors; (ii) solvents, and (iii) polymer substrates that swell when brought into contact with the solvents and deswell when the solvents were removed. In certain embodiments, the typical fabrication process is illustrated in FIG. 1A. First, a perovskite-precursor solution is prepared. In certain embodiments, $PbBr_2$ and $CH_3NH_3Br$ are combined with molar ratio of 1:3 in dimethylformamide to yield $MAPbBr_3$. In other embodiments, the solution is inorganic and comprises $PbX_2$ and $CsX$ to yield $CsPbX_3$. Second, the perovskite-precursor solution is processed directly onto a polymer matrix through spin coating, dip coating, slot die coating, ink jet printing, spray coating or cotton swab painting. Third, a solvent (e.g., dimethylformamide) penetrates the polymers, causes them to swell, and as a result, brings the perovskite precursors into the swelled polymers. Finally, the solvent is driven out of the polymer matrix (e.g., by baking at temperatures ranging from 25-120 degrees Celsius for 2-10 hours), leaving the perovskite-precursors within the polymer matrix to react and form high quality, well dispersed luminescent perovskite nanocrystals. Meanwhile, the polymer substrate deswells, or shrinks back, and forms a coherent barrier layer around the perovskite nanocrystals. This barrier protects them from water and oxygen from the surrounding environment. The perovskite-polymer composites possess high optical qualities showing narrow emission peaks and high photoluminescence quantum yield (PLQY) and environmental stabilities because of the coherent encapsulation by polymer barrier layers.

Numerous types of perovskites, solvents, and polymers may be used as long as the polymers swell and deswell when solvents enter and exit them. For example, perovskites have the formula of ABX3, in which A is an organic or inorganic cation. B is a metal cation, and X is at least one anion. The cation A may be selected from the organic group consisting of RNH3 where R is unsubstituted or substituted $C_1$-$C_{20}$ alkyl or inorganic ion wherein A is Cs+. B may be a divalent metal cation selected from the group consisting of Ca2+, Sr2+, Cd2+, Cu2+, Ni2+, Mn2+, Fe2+, Co2+, Pd2+, Ge2+, Sn2+, Pb2+, Sn2+, Yb2+, and Eu2, preferably Pb2+, Sn2+, Ge2+, more preferably Pb2+. X may be one or more different halide anions selected from the group consisting of fluoride (F−), chloride (Cl−), bromide (Br−) and iodide (I−), preferably, Br−. Solvents are readily available in the art and dissolve perovskites (e.g., dimethylformamide (DMF), dimethyl sulfoxide (DMSO), r-butyrolactone (GBL), acetone, and acetonitrile). Polymers that swell and dissolve and deswell in the solvents described herein may be selected from the group consisting of polystyrene (PS), polycarbonate (PC), cellulose acetate (CA), polyvinal chloride (PVC), poly (vinylidene fluoride), (PVDF), polyurene (PU), poly (methyl methacrylate) (PMMA), polyvinyl alcohol (PVA), and polynitriles.

Various embodiments relate to a swelling-deswelling microencapsulation strategy to achieve well dispersed, intimately passivated perovskite nanoparticles inside polymer matrixes and show that as-obtained perovskite-polymer composites have high photoluminescence efficiency, color purity and ultrahigh stability against heat and water attacks. Accordingly, it is an object of the present invention to provide novel semiconducting or insulating perovskite-polymer composites. It is another object of the present invention to provide low-cost, easily processed perovskite-polymer composites, which can be used as materials in flat panel displays, non-linear optical/photoconductive devices, chemical sensors, emitting and charge transporting layers in light-emitting diodes, solar cells and as channel layers in field-effect transistors. It is a further object of the present invention to provide simple and cost-effective methods of preparing the novel perovskite-polymer composites.

Methods of Making Perovskite-Polymer Composites

Perovskites are a large family of compounds that share the same chemical formula $ABX_3$. 'A' and 'B' denote cations, where A is much larger than B, and 'X' an anion. The versatility of perovskites makes them highly attractive as they can form multidimensional structures pertaining to the same chemical formula through use of different combinations of various components. A wide variety of elements may be incorporated each with different valency, so long as charge neutrality is satisfied, making perovskites one of the most highly studied materials.

There is a stringent structure-property relationship for perovskites pertaining to both crystal composition and ion arrangement that govern its structural, optical and electronic properties. It has been discovered that the use of a swelling-deswelling microencapsulation process provides for the fabrication or generation of a stable, highly luminescent perovskite (i.e., $CH_3NH_3PbBr_3$ ($MAPbBr_3$))-polymer composite that has great dispersion and passivation of crystalline perovskite nanocrystals or perovskite nanoparticles within a polymer matrix.

In certain embodiments, methods of making these highly stable perovskite-polymer composites are provided. First, perovskite precursors in solution are prepared and are contacted with a polymer matrix. The contacting is in the presence of a solvent. A solvent-induced polymer swelling-deswelling process is created where the solvent penetrates polymer in the polymer matrix causing swelling and entry of perovskite precursors into the polymer. The solvent is removed from the polymer matrix leaving the perovskite precursors in the polymer matrix to react and form perovskite nanocrystals. The polymer subsequently deswells forming a barrier layer around the perovskite nanocrystals to create a stable perovskite-polymer composite.

The perovskite precursor solution comprising $PbX_2$ and $RNH_3X$ to yield $RNH_3PbX_3$ is in solvent in certain embodiments and is processed onto the polymer matrix using a process selected from the group consisting of spin coating, dip coating, slot die coating, ink jet coating, spray coating and cotton swab painting. The perovskite precursor solution may be an inorganic solution comprising $PbX_2$ and $CsX$ to yield $CsPbX_3$ in solvent.

In certain embodiments, solvents are selected from the group consisting of dimethylformamide (DMF), dimethyl sulfoxide (DMSO), r-butyrolactone (GBL), acetone, and acetonitrile. The solvent may be removed by baking at 25-120 degrees Celsius.

In other embodiments, the polymer is selected from the group consisting of polystyrene (PS), polycarbonate (PC), cellulose acetate (CA), polyvinal chloride (PVC), poly (vinylidene fluoride), (PVDF), polyurene (PU), poly (methyl methacrylate) (PMMA), polyvinyl alcohol (PVA), and polynitriles.

Perovskite-polymer composites made by the method of claim 1 are provided and described in Table A and Example 1-3.

In certain embodiments, a precursor solution is prepared using $PbBr_2$ and $CH_3NH_3Br$ combined 1:3 or 4:5 in dimethylformamide to yield $MAPbBr_3$, a solute ready to be introduced into a polymer matrix.

Second, the perovskite-precursor solution comprising MAPbBr3 is processed directly onto a polymer substrate through spin coating, dip coating, slot die coating, spray coating, ink jet printing, or cotton swab painting. Spin coating is a procedure used to deposit uniform thin films to flat substrates. A small amount of coating material is usually applied on the center of the substrate that is either spinning at low speed or not spinning at all. The substrate is then rotated at high speed in order to spread the coating material by centrifugal force. A machine used for spin coating is called a spin coater, or simply spinner. Rotation is continued while the fluid spins off the edges of the substrate, until the desired thickness of the film is achieved. The applied solvent is usually volatile, and simultaneously evaporates. So, the higher the angular speed of spinning, the thinner the film. The thickness of the film also depends on the viscosity and concentration of the solution and the solvent.

Dip coating is an industrial coating process that may have been used to make candles. For flexible laminar substrates such as fabrics, dip coating may be performed as a continuous roll-to-roll process. For coating a 3D object, it may simply be inserted and removed from the bath of coating. For some products, such as early methods of making candles, the process is repeated many times, allowing a series of thin films to bulk up to a relatively thick final object. The dip-coating process can be separated into five stages: Immersion: The substrate is immersed in the solution of the coating material at a constant speed (preferably jitter-free).

Start-up: The substrate has remained inside the solution for a while and is starting to be pulled up.

Deposition: The thin layer deposits itself on the substrate while it is pulled up. The withdrawing is carried out at a constant speed to avoid any jitters. The speed determines the thickness of the coating (faster withdrawal gives thicker coating material).

Drainage: Excess liquid will drain from the surface.

Evaporation: The solvent evaporates from the liquid, forming the thin layer. For volatile solvents, such as alcohols, evaporation starts already during the deposition & drainage steps.

Slot die coating technology is used to deposit a variety of liquid chemistries onto glass, stainless steel, and plastic substrates for the development and production of a broad range of applications. This is achieved through the precise metering the process fluid and dispensing it at a controlled rate while the coating die is precisely moved relative to the substrate.

The term "ink jet coating" is an emerging manufacturing technique in which ink jet technology is used to deposit materials on substrates. The technique aims to eliminate fixed costs of production and reduce the amount of materials used.

Spray coating is a coating technique where a device sprays a coating (paint, ink, varnish, etc.) through the air onto a surface. The most common types employ compressed gas—usually air—to atomize and direct the paint particles.

Third, a solvent (e.g., dimethylformamide) penetrates the polymers, causes them to swell, and as a result, brings the perovskite precursors into the swelled polymers. A solution of different concentrations of perovskites were tested in solvent and it was found that PL wavelength was dependent of perovskite concentrations, as shown in FIG. 11A-11F. More specifically, when being brought into contact with good solvents, polymer chains will swell and expand, letting in solvents and solutes. Such expansion is generally recoverable through a deswelling process when solvent is evaporated. Perovskite precursors can be introduced into polymer matrixes as solute through the solvent-induced polymer swelling process. When the solvent is driven out of the polymer matrix (for example, by baking or subject the matrix to a vacuum condition), the perovskite precursors will be left within to react and form high quality, well dispersed perovskite nanoparticles. Meanwhile the polymer matrix will deswell, shrink back and form coherent barrier layer around the perovskite nanoparticles, protecting them from water, oxygen or heat of the surrounding environments (FIG. 1A).

Any solvent or combination of solvents that is capable of dissolving the various ingredients at a super-ambient temperature at a sub-ambient temperature may be used. The temperature could be between room temperature and high temperature close to boiling points of the solvents, roughly between 25° C. and 120° C. The solvent may be selected from protic solvents such as monohydric and polyhydric alcohols. Such protic solvents include ethylene glycol, propylene glycol, butylene glycol, methanol, ethanol, propanol, butanol, particularly 2-butanol, and a mixture thereof. Non-protic solvents, such as acetonitrile, dimethyl formamide (DMF), dimethyl sulfoxide (DMSO), r-butyrolactone (GBL), and tetrahydrofuran can also be used either alone or in combination with a protic solvent. A combination of protic solvents with other, less polar protic or non-protic solvents may also be used.

Preferably, the ingredients are contacted at a super-ambient temperature from about 80 to 140° C., more preferably at a super-ambient temperature of about 116° C. Contacting is carried at a temperature and for a length of time sufficient to produce a perovskite. The resulting reaction mixture is then cooled slowly to a sub-ambient temperature, usually in the range from about −30 to +20° C., preferably to a sub-ambient temperature, which is about −20° C. Preferably, the cooling rate is about 1.5° C./hour. However, somewhat faster or slower rates may also be used.

Perovskite-Polymer Composites

A perovskite-polymer composite made by the methods described herein are provided in certain embodiments. The perovskite, most commonly denoted as $ABX_3$, often has the A site occupied by an organic component. Similarly to its parent oxide perovskite, perovskites must obey allowable tolerance factors to achieve desired crystal symmetry. The structural dimensionality of perovskites can be easily tuned through varying components to obtain zero-dimensional (0D) (e.g. $(CH_3NH_3)_4PbX_6 2H_2O$), one-dimensional (1D) (e.g. $C_5H_{10}NH_2PbX_3$), two dimensional (2D) (e.g. $C_nH_{2n+1}NH_3PbX_4$), and three dimensional ($CH_3NH_3PbX_3$) structures simply by changing organic-inorganic precursor components and/or molar ratios. Here a clear distinction between organic and inorganic perovskites must be noted. Aside from a clear difference in A species, inorganic (e.g. $Cs^+$) versus organic (e.g. $CH_3NH_3^+$), there is also a change in symmetry of the A site component from spherical (inorganic) to non-spherical organic.

The basic structural motif of the perovskite family is the $ABX_3$ structure (FIG. 16), which has a three-dimensional network of corner-sharing $BX_6$ octahedra. The B component in the $ABX_3$ structure is a metal cation that can adopt an octahedral coordination of X anions. The A cation is situated in the 12-fold coordinated holes between the $BX_6$ octahedra and is most commonly inorganic. By replacing the inorganic A cation with an organic cation, an organic-inorganic perovskite can be formed.

The cation A may be selected from the group consisting of $RNH_3$ where R is $CH_3$ where R is unsubstituted or substituted $C_1$-$C_{20}$ alkyl or inorganic ion wherein A is Cs+—B may be a divalent metal cation selected from the group consisting of Ca2+, Sr2+, Cd2+, Cu2+, Ni2+, Mn2+, Fe2+, Co2+, Pd2+, Ge2+, Sn2+, Pb2+, Sn2+, Yb2+, and Eu2, preferably Pb2+, Sn2+, Ge2+, more preferably, Pb2+. X may be one or more different halide anions selected from the group consisting of fluoride ($F^-$), chloride ($Cl^-$), bromide ($Br^-$), iodide ($I^-$), preferably, Br−.

In these ionic compounds, the organic component is a part of the structure, since the structure actually depends on the organic cation for charge neutrality. Therefore, such compounds conform to specific stoichiometries. For example, if X is a monovalent anion such as a halide, and A is a monovalent cation, then B should be a divalent metal. Layered, two-dimensional $A_2BX_4$, $ABX_4$ and one-dimensional $A_3BX_5$, $A_2A'BX_5$ perovskites also exist and are considered derivatives of the three-dimensional parent family. See, D. B. Mitzi, *Prog. Inorg. Chem.*, 48, 1 (1999) where a review is presented of the state of the art and describes organic-inorganic perovskites that combine the useful properties of organic and inorganic materials within a single molecular-scale composite.

A Cation

The most widely used A cation for organic-inorganic perovskites is the small methylammonium ion (MA; $CH_3NH_3^+$; $R_{MA}$=0.18 nm). Thus, one may speculate that substitution of MA with a larger cation should yield higher symmetry and correspondingly a smaller band gap to allow for enhanced light harvesting across the spectrum. In a quest to replace the unfavorably sized MA ion, other cations have been explored that include ethylammonium (EA), formamidinium (FA) and cesium (Cs), where $R_{Cs}<R_{MA}<R_{FA}<R_{EA}$. However, replacement of MA with an excessively large cation, such as EA ($CH_3CH_2NH_3^+$) disrupts the 3D symmetry yielding a 2D orthorhombic crystal structure with a relatively large band gap of 2.2 eV for $EAPbI_3$. Thus, it is apparent that an organic cation whose ionic radius is between that of MA and EA is desirable for 3D perovskite.

B Cation

The B metal cation sites in organic-inorganic perovskites are occupied by the group IVA metals in a divalent oxidation state ($Pb^{2+}$, $Sn^{2+}$, $Ge^{2+}$). Lead (Pb) has proven the superior constituent compared to tin (Sn), both in terms of performance and stability, and consequentially has been the most widely employed of the group IVA metals. Upon proceeding up group IVA on the periodic table (Pb→Ge), a reduction in stability of the divalent oxidation state occurs for each element as a consequence of reduced inert electron pair effects. However, this also corresponds to an increase in electronegativity, or covalent character, that in turn yields a reduction in band gap. Thus, one may speculate the ideal case to be a lower atomic number group IVA element, however, this also goes hand-in-hand with a compromise in divalent metal stability.

X Anion

The halide anion has been the most effectively varied component in organic-inorganic perovskites. Upon proceeding down group VIIA (Cl→I) atomic size increases, absorption spectra shifts to longer wavelengths, and a reduction in energy (redshift) occurs. This can be attributed to the decrease in electronegativity to better match that of Pb, effectively reducing ionic and increasing covalent character. Bromide has been most effectively used to tune the band gap of organic-inorganic perovskites. $MAPbBr_3$ adopts a cubic structure at room temperature.

The perovskite-polymer composite s made by the methods described herein may be used as downconverters for a backlight unit (BLU) of liquid crystal displays (LCDs) and be used for photovoltaic applications. The polymer is one or a combination selected from the group consisting of polystyrene (PS), polycarbonate (PC), cellulose acetate (CA), polyvinyl chloride (PVC), poly (vinylidene fluoride), (PVDF), polyurene (PU), poly (methyl methacrylate) (PMMA), polyvinyl alcohol (PVA), and polynitriles. In other embodiments, a perovskite-polymer composite is comprised of perovskite nanocrystals having a polymer coating. The polymer coating serves as a barrier layer around the perovskite nanocrystals to create a protective coating from environmental stresses (e.g., heat, moisture, cold). The perovskite-polymer composite is water resistant for at least about two months, and thermally stable from 100 degrees Celsius to about 200 degrees Celsius.

Perovskite-Polymer Composites of Various Embodiments

Various embodiments relate to a perovskite-polymer composite including perovskite nanocrystals dispersed in a polymer matrix.

According to various embodiments, the perovskite-polymer composite may exhibit a photoluminescent quantum yield of from at least about 20% to about 80%, or from at least about 28% to about 50%, or from at least about about 20% to about 40%, or from at least about 60% to about 80%. Each range described herein is intended to include all numerical values encompassed by the range. Furthermore, additional ranges may be formed from any lower limits and/or upper limits described herein. For example, the perovskite-polymer composite may exhibit a photoluminescent quantum yield within a range having a lower limit and/or an upper limit. The range may include or exclude the lower limit and/or the upper limit. By way of example and not limitation, a lower limit and/or an upper limit may be selected from 10, 15, 20, 25, 30, 35, 40, 45, 50, 55, 60, 65, 70, 75, 80, 85, 90, 95 and 100%. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the perovskite-polymer composite may exhibit a photoluminescent quantum yield of: about 10 to about 100%, less than about 10%, greater than about 10%, less than about 100%, or greater than about 100%, etc. All such ranges are contemplated and are intended to be explicitly disclosed and recited. Each value recited is intended to be modified by the term "about."

According to various embodiments, the perovskite-polymer composite may exhibits a photoluminescence spectrum having a full width half maximum of from about 15 to about 45 nm, or from about 20 nm to about 30 nm, or from about 35 nm to about 45 nm, or from about 25 nm to about 35 nm, or from about of 15 nm to 20 nm. Each range described herein is intended to include all numerical values encompassed by the range. Furthermore, additional ranges may be formed from any lower limits and/or upper limits described herein. For example, the perovskite-polymer composite may exhibits a photoluminescence spectrum having a full width half maximum within a range having a lower limit and/or an upper limit. The range may include or exclude the lower limit and/or the upper limit. By way of example and not limitation, a lower limit and/or an upper limit may be selected from 15, 20, 25, 30, 35, 40 and 45 nm. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the perovskite-polymer composite may exhibits a photoluminescence spectrum having a full width half maximum of: about 15 to about 45 nm, less than about 15 nm, greater than about 15 nm, less than about 45 nm, or greater than about 45 nm, etc. All such ranges are contemplated and are intended to be explicitly disclosed and recited. Each value recited is intended to be modified by the term "about."

According to various embodiments, the perovskite-polymer composite may remain stable and luminescent in water for a time period of at least about 2 years. Each range described herein is intended to include all numerical values encompassed by the range. Furthermore, additional ranges may be formed from any lower limits and/or upper limits described herein. For example, the perovskite-polymer composite may remain stable and luminescent in water for a time period within a range having a lower limit and/or an upper limit. The range may include or exclude the lower limit and/or the upper limit. By way of example and not limitation, a lower limit and/or an upper limit may be selected from 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75 and 10 years. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the perovskite-polymer composite may remain stable and luminescent in water for a time period of: about 0.25 to about 10 years, less than about 0.25 years, greater than about 0.25 years, less than about 10 years, or greater than about 10 years, etc. All such ranges are contemplated and are intended to be explicitly disclosed and recited. Each value recited is intended to be modified by the term "about."

The perovskite-polymer composite may retain a retention percentage of its initial brightness after being exposed to continuous 100 mW/cm$^2$ laser illumination for an exposure time period. The perovskite-polymer composite may also recover a recovery percentage of its initial brightness after being exposed to continuous 100 mW/cm$^2$ laser illumination for the exposure time period after a recovery time period after completion of laser illumination for the exposure time period.

According to various embodiments, the exposure time period may be in a range of about 10 hours, or about 4 hours. Each range described herein is intended to include all numerical values encompassed by the range. Furthermore, additional ranges may be formed from any lower limits and/or upper limits described herein. For example, the exposure time period may be within a range having a lower limit and/or an upper limit. The range may include or exclude the lower limit and/or the upper limit. By way of example and not limitation, a lower limit and/or an upper limit may be selected from 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5 and 15 hours. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the exposure time period may be of: about 0.5 to about 15 hours, less than about 0.5 hours, greater than about 0.5 hours, less than about 15 hours, or greater than about 15 hours, etc. All such ranges are contemplated and are intended to be explicitly disclosed and recited. Each value recited is intended to be modified by the term "about."

According to various embodiments, the retention percentage of initial brightness retained may be in a range of from about 60% to about 80%, or at least about 50% to about 60%, or at least about 85% to about 95%. Each range described herein is intended to include all numerical values encompassed by the range. Furthermore, additional ranges may be formed from any lower limits and/or upper limits described herein. For example, the retention percentage of initial brightness retained may be within a range having a lower limit and/or an upper limit. The range may include or exclude the lower limit and/or the upper limit. By way of example and not limitation, a lower limit and/or an upper limit may be selected from 40, 45, 50, 55, 60, 65, 70, 75, 80, 85, 90, 95 and 100%. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the retention percentage of initial brightness retained may be of: about 40 to about 100%, less than about 40%, greater than about 40%, less than about 100%, or greater than about 100%, etc. All such ranges are contemplated and are intended to be explicitly disclosed and recited. Each value recited is intended to be modified by the term "about."

According to various embodiments, the recovery percentage of initial brightness may be in a range of from about 90% to about 95%. Each range described herein is intended to include all numerical values encompassed by the range. Furthermore, additional ranges may be formed from any lower limits and/or upper limits described herein. For example, the recovery percentage of initial brightness may be within a range having a lower limit and/or an upper limit. The range may include or exclude the lower limit and/or the upper limit. By way of example and not limitation, a lower limit and/or an upper limit may be selected from 40, 45, 50, 55, 60, 65, 70, 75, 80, 85, 90, 95 and 100%. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the recovery percentage of initial brightness may be of: about 40 to about 100%, less than about 40%, greater than about 40%, less than about 100%, or greater than about 100%, etc. All such ranges are contemplated and are intended to be explicitly disclosed and recited. Each value recited is intended to be modified by the term "about."

According to various embodiments, the recovery time period may be in a range of from about 1 minute after completion of laser illumination for the exposure time period. Each range described herein is intended to include all numerical values encompassed by the range. Furthermore, additional ranges may be formed from any lower limits and/or upper limits described herein. For example, the recovery time period may be within a range having a lower limit and/or an upper limit. The range may include or exclude the lower limit and/or the upper limit. By way of example and not limitation, a lower limit and/or an upper limit may be selected from 0.25, 0.5, 0.75, 1, 1.25, 1.5, 1.75, 2, 2.25, 2.5, 2.75, 3, 3.25, 3.5, 3.75, 4, 4.25, 4.5, 4.75, 5, 10, 15, 20, 25, 30, 40, 50, 60, 70, 80 and 90 minutes after completion of laser illumination for the exposure time period. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the recovery time period may be of: about 0.25 to about 90 minutes after completion of laser illumination for the exposure time period, less than about 0.25 minutes after completion of laser illumination for the exposure time period, greater than about 0.25 minutes after completion of laser illumination for the exposure time period, less than about 90 minutes after completion of laser illumination for the exposure time period, or greater than about 90 minutes after completion of laser illumination for the exposure time period, etc. All such ranges are contemplated and are intended to be explicitly disclosed and recited. Each value recited is intended to be modified by the term "about."

The perovskite-polymer composite may exhibit no, negligible, or limited visible photoluminescence decay after at least about 60 days in a 70° C. and 90% relative humidity incubator.

Polymer Matrix

The polymer matrix may include a polymeric material selected from poly(ethylene terephthalate) (PET), poly(m-ethyl methacrylate) (PMMA), polyethylene naphthalate (PEN) and silicone.

Perovskite Nanocrystals

According to various embodiments, according to various embodiments, the perovskite nanocrystals may have an average size of from about 5 nm to about 20 nm. Each range described herein is intended to include all numerical values encompassed by the range. Furthermore, additional ranges may be formed from any lower limits and/or upper limits described herein. For example, according to various embodiments, the perovskite nanocrystals may have an average size within a range having a lower limit and/or an upper limit. The range may include or exclude the lower limit and/or the upper limit. By way of example and not limitation, a lower limit and/or an upper limit may be selected from 1, 2, 3, 4, 5, 10, 15, 20, 25, 30, 35, 40, 45, 50, 55, 60, 65, 70, 75, 80, 85, 90, 95 and 100 nm. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, according to various embodiments, the perovskite nanocrystals may have an average size of: about 1 to about 100 nm, less than about 1 nm, greater than about 1 nm, less than about 100 nm, or greater than about 100 nm, etc. All such ranges are contemplated and are intended to be explicitly disclosed and recited. Each value recited is intended to be modified by the term "about."

The perovskite nanocrystals may have the formula: $ABX_3$, wherein A is an organic or inorganic cation; wherein B is a metal cation; wherein X is a halide. According to various embodiments, A may be selected from Cs+, $CH_3NH^{3+}(MA^+)$, and $CH(NH_2)^{2+}(FA^+)$. According to various embodiments, B may be selected from $Ca^{2+}$, $Sr^{2+}$, $Cd^{2+}$, $Cu^{2+}$, $Ni^{2+}$, $Mn^{2+}$, $Fe^{2+}$, $Co^{2+}$, $Pd^{2+}$, $Ge^{2+}$, $Sn^{2+}$, $Pb^{2+}$, $Yb^{2+}$, and $Eu^{2+}$. According to various embodiments, X may be selected from $F^-$, $Cl^-$, $Br^-$, and $I^-$. According to various embodiments, the perovskite nanocrystals may comprise $CsPbBr_3$. According to various embodiments, the perovskite nanocrystals may comprise $CsPbBr_{0.75}I_{2.25}$. According to various embodiments, perovskite nanocrystals may comprise $MAPbBr_3$. According to various embodiments, the perovskite nanocrystals may comprise $CsPbCl_1Br_2$.

High Temperature Methods Generally

The room temperature swelling deswelling microencapsulation (swelling-deswelling microencapsulation) strategies already described herein achieve well dispersed, intimately passivated perovskite nanocrystals inside polymer matrices. By these strategies, green-emitting perovskite-polymer composites achieved high PL efficiency, excellent color purity and high stability against heat and water exposure. However, the red-emitting perovskite polymer composites showed dimmed photoluminescence, and the green-emitting perovskite polymer composites may be improved in terms of their stability for practical applications.

To improve various embodiments described herein, other embodiments may utilize more stable polymers with lower oxygen/water permeability. Generally, the room temperature swelling-deswelling microencapsulation strategies described herein are not optimal for such polymers due to limited swelling ratio. More specifically, the swelling-deswelling microencapsulation methods according to various embodiments already discussed herein to convert highly stable polymer matrices may be difficult because of the polymers' high crystallinity, tight structure, and lack of reactive groups, resulting in a low swelling ratio of the polymers in the solvent.

Various embodiments provide a process to swell the highly resistant polymers at high-enough temperature while avoiding causing damage to the polymer chains. Like other embodiments, during the deswelling process, the perovskite precursors start to nucleate, and nanocrystals form inside the polymer. Through this simple, cost effective process, high efficiency, good color purity and even better stability perovskite polymer composites may be achieved even without additional barrier layers. The process is very simple and cost-effective. By tuning the halide compositions, perovskite-polymer composite films of different colors can be obtained, covering the entire visible range, with narrow linewidths of 16 nm~44 nm.

Figure 12A:
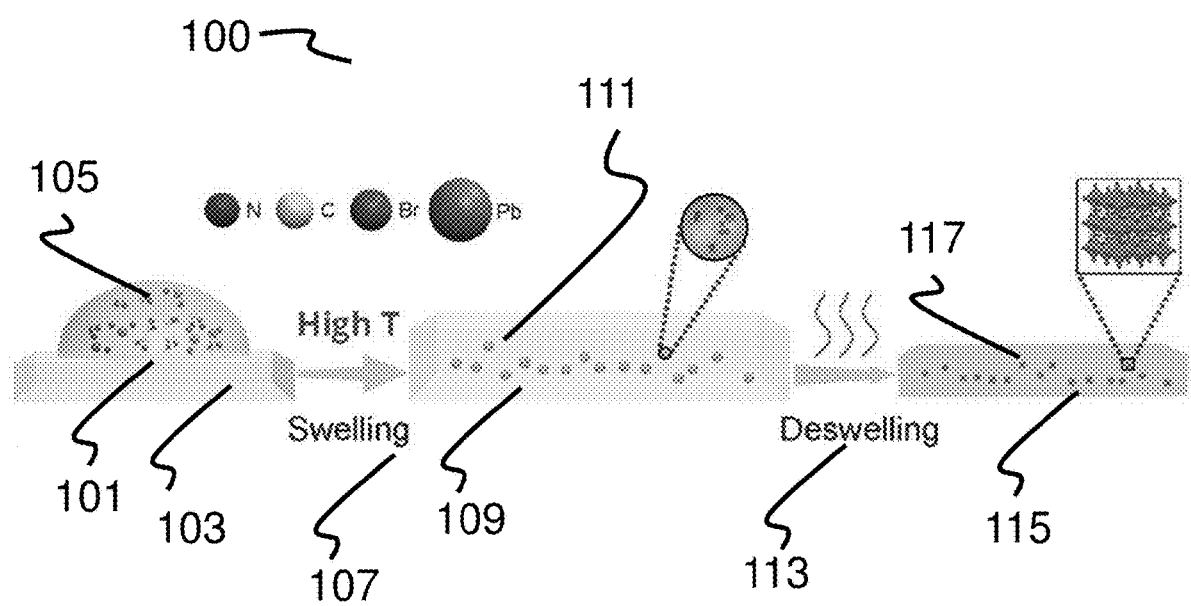
FIG. 12A is an example according to various embodiments, illustrating a schematic diagram of a method for forming a perovskite-polymer composite.

Various embodiments relate to a method for producing a perovskite-polymer composite. FIG. 12A is an example according to various embodiments, illustrating a schematic diagram of a method for producing perovskite-polymer composites. The method 100 may include contacting 101 a solid material 103 comprising a polymer matrix with a solution 105 comprising a perovskite precursor; allowing the solution to penetrate the solid material 107 to yield a swollen solid material 109 comprising the perovskite precursor 111 dispersed within the polymer matrix; optionally contacting the swollen solid material with an antisolvent; and annealing 113 the swollen solid material 109 to crystallize the perovskite precursor 111 and to yield the perovskite-polymer composite 115 comprising perovskite nanocrystals 117 dispersed in the polymer matrix. This strategy is very general, and there are wide selections of perovskites, solvents, antisolvents, and polymers. Details of many possible variations are described, but a person having ordinary skill in the art will readily appreciate other variations.

Figure 12B:
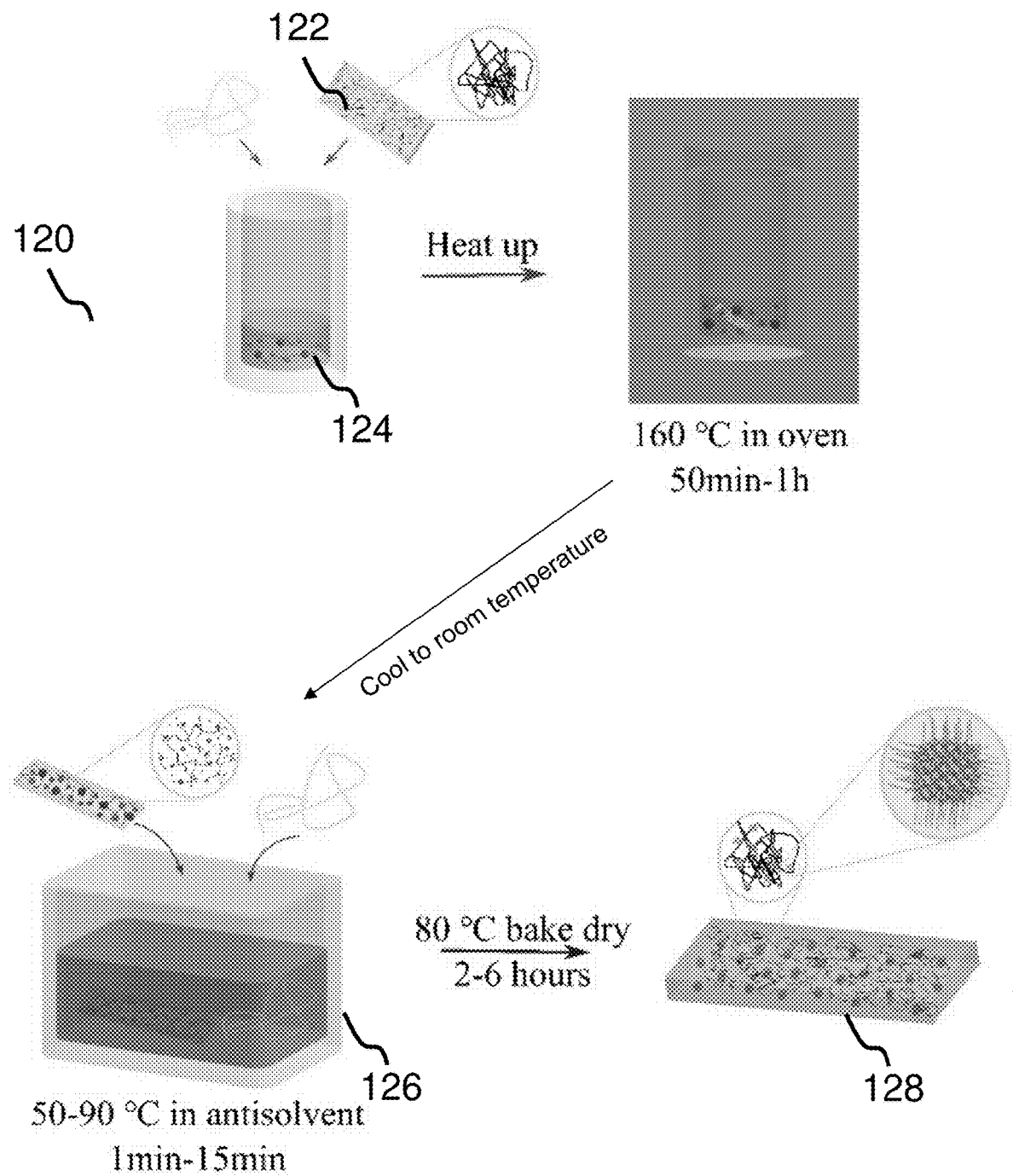
FIG. 12B is an example according to various embodiments, illustrating a schematic diagram of a method for forming a perovskite-polymer composite.

FIG. 12B is an example according to various embodiments, illustrating a schematic diagram of a method for forming a perovskite-polymer composite. The method 120 may include contacting 120 a solid material 122 comprising a polymer matrix with a solution 124 comprising a perovskite precursor; heating the solid material 122 and the solution 124 to disperse the perovskite precursor within the polymer matrix. The heating may be done at about 160 degrees Celsius in an oven for a time period of about 50 minutes to 1 hour after which the resulting material may be cooled to room temperature. The cooled material may be contacted with an antisolvent 126 at a temperature of about 50 to about 90 degrees Celsius for a time period of about 1 minute to 15 minutes. Finally, the material may be baked dry at a temperature of about 80 degrees Celsius for a time period of about 2 to about 6 hours to form a peroviskite-polymer composite 128 as described in various embodiments. This strategy is very general, and there are wide selections of perovskites, solvents, antisolvents, and polymers. Details of many possible variations are described, but a person having ordinary skill in the art will readily appreciate other variations.

Additional Details of the Methods

Various embodiments relate to a method for producing a perovskite-polymer composite. The method may include contacting a solid material comprising a polymer matrix with a solution comprising a perovskite precursor; allowing the solution to penetrate the solid material to yield a swollen solid material comprising the perovskite precursor dispersed within the polymer matrix; optionally contacting the swollen solid material with an antisolvent; and annealing the swollen solid material to crystallize the perovskite precursor and to yield the perovskite-polymer composite comprising perovskite nanocrystals dispersed in the polymer matrix.

The solvent may be a polar solvent able to dissolve the perovskite precursor. The solution may further include a solvent selected from dimethylformamide (DMF), dimethyl sulfoxide (DMSO), N-methyl-2-pyrrolidone (NMP), dimethylpropyleneurea (DMPU), and 1,3-Dimethyl-2-imidazoidinone (DMI).

According to various embodiments, the step of contacting the solid material comprising the polymer matrix with the solution comprising the perovskite precursor comprises immersing the solid material into the solution. According to various embodiments, the solid material may be immersed into the solution for an immersion time period of at least about 1 hour. Each range described herein is intended to include all numerical values encompassed by the range. Furthermore, additional ranges may be formed from any lower limits and/or upper limits described herein. For example, the solid material may be immersed into the solution for an immersion time period within a range having a lower limit and/or an upper limit. The range may include or exclude the lower limit and/or the upper limit. By way of example and not limitation, a lower limit and/or an upper limit may be selected from 0.1, 0.2, 0.3, 0.4, 0.5, 0.6, 0.7, 0.8, 0.9, 1, 2, 3, 4, 5, 10, 15 and 20 hour. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the solid material may be immersed into the solution for an immersion time period of: about 0.1 to about 20 hour, less than about 0.1 hour, greater than about 0.1 hour, less than about 20 hour, or greater than about 20 hour, etc. All such ranges are contemplated and are intended to be explicitly disclosed and recited. Each value recited is intended to be modified by the term "about."

According to various embodiments, after the contacting step, the method may further include a step of heating the solution. According to various embodiments, the solution may be heated to a temperature of at least about 160 degrees Celsius. Each range described herein is intended to include all numerical values encompassed by the range. Furthermore, additional ranges may be formed from any lower limits and/or upper limits described herein. For example, the solution may be heated to a temperature within a range having a lower limit and/or an upper limit. The range may include or exclude the lower limit and/or the upper limit. By way of example and not limitation, a lower limit and/or an upper limit may be selected from 100, 110, 120, 130, 140, 150, 160, 170, 180, 190 and 200 degrees Celsius. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the solution may be heated to a temperature of: about 100 to about 200 degrees Celsius. All such ranges are contemplated and are intended to be explicitly disclosed and recited. Each value recited is intended to be modified by the term "about."

According to various embodiments, the solution may be pre-heated, prior to the contacting step, to a temperature of at least about 160 degrees Celsius. Each range described herein is intended to include all numerical values encompassed by the range. Furthermore, additional ranges may be formed from any lower limits and/or upper limits described herein. For example, according to various embodiments, the solution may be pre-heated, prior to the contacting step, to a temperature within a range having a lower limit and/or an upper limit. The range may include or exclude the lower limit and/or the upper limit. By way of example and not limitation, a lower limit and/or an upper limit may be selected from 100, 110, 120, 130, 140, 150, 160, 170, 180, 190 and 200 degrees Celsius. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, according to various embodiments, the solution may be pre-heated, prior to the contacting step, to a temperature of: about 100 to about 200 degrees Celsius. All such ranges are contemplated and are intended to be explicitly disclosed and recited. Each value recited is intended to be modified by the term "about."

After pre-heating, the step of contacting the solid material comprising the polymer matrix with the solution comprising the perovskite precursor may comprise immersing the solid material into the solution for a shorter time period. According to various embodiments, the solid material may be immersed into the solution for a post-preheating immersion time period of at least about 1 minute. Each range described herein is intended to include all numerical values encompassed by the range. Furthermore, additional ranges may be formed from any lower limits and/or upper limits described herein. For example, the solid material may be immersed into the solution for a post-preheating immersion time period within a range having a lower limit and/or an upper limit. The range may include or exclude the lower limit and/or the upper limit. By way of example and not limitation, a lower limit and/or an upper limit may be selected from 0.25, 0.5, 0.75, 1, 2, 3, 4, 5, 6, 7, 8, 9 and 10 minute. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the solid material may be immersed into the solution for a post-preheating immersion time period of: about 0.25 to about 10 minute, less than about 0.25 minute, greater than about 0.25 minute, less than about 10 minute, or greater than about 10 minute, etc. All such ranges are contemplated and are intended to be explicitly disclosed and recited. Each value recited is intended to be modified by the term "about."

According to various embodiments, the antisolvent may be a non-polar solvent unable to dissolve the perovskite nanocrystals. The antisolvent may be selected from toluene, chloroform, and isopropyl alcohol (IPA). According to various embodiments, the antisolvent may be at a temperature of about 85 degrees Celsius Each range described herein is intended to include all numerical values encompassed by the range. Furthermore, additional ranges may be formed from any lower limits and/or upper limits described herein. For example, the antisolvent may be at a temperature within a range having a lower limit and/or an upper limit. The range may include or exclude the lower limit and/or the upper limit. By way of example and not limitation, a lower limit and/or an upper limit may be selected from 50, 55, 60, 65, 70, 75, 80, 85, 90, 95, 100, 105, 110, 115, 120, 125, 130, 135, 140, 145 and 150 degrees Celsius. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the antisolvent may be at a temperature of: about 50 to about 150 degrees Celsius, less than about 50 degrees Celsius, greater than about 50 degrees Celsius, less than about 150 degrees Celsius, or greater than about 150 degrees Celsius, etc. All such ranges are contemplated and are intended to be explicitly disclosed and recited. Each value recited is intended to be modified by the term "about."

The step of contacting the swollen solid material with the antisolvent may include immersing the swollen solid material into the antisolvent. According to various embodiments, the swollen solid material may be immersed into the antisolvent for a time period of at least about 1 minute. Each range described herein is intended to include all numerical values encompassed by the range. Furthermore, additional ranges may be formed from any lower limits and/or upper limits described herein. For example, the swollen solid material may be immersed into the antisolvent for a time period within a range having a lower limit and/or an upper limit. The range may include or exclude the lower limit and/or the upper limit. By way of example and not limitation, a lower limit and/or an upper limit may be selected from 0.25, 0.5, 0.75, 1, 2, 3, 4, 5, 10, 15, 20, 25, 30, 35, 40, 45, 50, 55 and 60 minutes. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the swollen solid material may be immersed into the antisolvent for a time period of: about 0.25 to about 60 minutes, less than about 0.25 minutes, greater than about 0.25 minutes, less than about 60 minutes, or greater than about 60 minutes, etc. All such ranges are contemplated and are intended to be explicitly disclosed and recited. Each value recited is intended to be modified by the term "about."

According to various embodiments, the annealing may be conducted at a temperature of at least about 25 degrees Celsius. Each range described herein is intended to include all numerical values encompassed by the range. Furthermore, additional ranges may be formed from any lower limits and/or upper limits described herein. For example, the annealing may be conducted at a temperature within a range having a lower limit and/or an upper limit. The range may include or exclude the lower limit and/or the upper limit. By way of example and not limitation, a lower limit and/or an upper limit may be selected from 20, 25, 30, 35, 40, 45, 50, 55, 60, 65, 70, 75, 80, 85, 90, 95 and 100 degrees Celsius. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the annealing may be conducted at a temperature of: about 20 to about 100 degrees Celsius, less than about 20 degrees Celsius, greater than about 20 degrees Celsius, less than about 100 degrees Celsius, or greater than about 100 degrees Celsius, etc. All such ranges are contemplated and are intended to be explicitly disclosed and recited. Each value recited is intended to be modified by the term "about."

According to various embodiments, the annealing may be conducted for a time period of at least about 0.5 hours. Each range described herein is intended to include all numerical values encompassed by the range. Furthermore, additional ranges may be formed from any lower limits and/or upper limits described herein. For example, the annealing may be conducted for a time period within a range having a lower limit and/or an upper limit. The range may include or exclude the lower limit and/or the upper limit. By way of example and not limitation, a lower limit and/or an upper limit may be selected from 0.5, 1, 2, 3, 4, 5, 10, 15 and 20 hours. A range formed from a single lower limit includes at least the lower limit and all numerical values greater than the lower limit regardless of whether the values are explicitly recited in this disclosure. A range formed from a single upper limit includes at least the upper limit and all numerical values less than the upper limit regardless of whether the values are explicitly recited in this disclosure. A range formed from a combination of a lower limit and an upper limit includes at least the lower limit, the upper limit, and all numerical values therebetween regardless of whether the values are explicitly recited in this disclosure. For example, based on the set of exemplary upper limits and lower limits explicitly recited above, the annealing may be conducted for a time period of: about 0.5 to about 20 hours, less than about 0.5 hours, greater than about 0.5 hours, less than about 20 hours, or greater than about 20 hours, etc. All such ranges are contemplated and are intended to be explicitly disclosed and recited. Each value recited is intended to be modified by the term "about."

The polymer matrix may have the properties, composition, and/or structure as described in any of the embodiments herein. For example, the polymer matrix may include a polymeric material selected from poly(ethylene terephthalate) (PET), poly(methyl methacrylate) (PMMA), polyethylene naphthalate (PEN) and silicone.

The perovskite nanocrystals may have the properties, composition, and/or structure as described in any of the embodiments herein. For example, the perovskite nanocrystals may have the formula: $ABX_3$. A may be an organic or inorganic cation. B may be a metal cation. X may be a halide. For example, A may be selected from Cs+, $CH_3NH^{3+}$ ($MA^+$), and $CH(NH_2)^{2+}$ ($FA^+$); B may be selected from $Ca^{2+}$, $Sr^{2+}$, $Cd^{2+}$, $Cu^{2+}$, $Ni^{2+}$, $Mn^{2+}$, $Fe^{2+}$, $Co^{2+}$, $Pd^{2+}$, $Ge^{2+}$, $Sn^{2+}$, $Pb^{2+}$, $Yb^{2+}$, and $Eu^{2+}$; and X may be selected from $F^-$, $Cl^-$, $Br^-$, and $I^-$.

Details of Perovskite Nanocrystals for Higher Temperature Methods

The perovskite nanocrystals may have the formula: $ABX_3$, wherein A is an organic or inorganic cation; wherein B is a metal cation; and wherein X is a halide. According to various embodiments, A may be selected from the group including but not limited to $Cs^+$, $CH_3NH_3^+$($MA^+$), and $CH(NH_2)_2^+$($FA^+$). According to various embodiments, B may be selected from the group including but not limited to $Ca_2^+$, $Sr_2^+$, $Cd_2^+$, $Cu_2^+$, $Ni_2^+$, $Mn_2^+$, $Fe_2^+$, $Co_2^+$, $Pd_2^+$, $Ge_2^+$, $Sn_2^+$, $Pb_2^+$, $Yb_2^+$, and $Eu_2^+$. According to various embodiments, X may be selected from the group including but not limited to F−, Cl−, Br−, and I−. Metal halide perovskite materials may be employed according to various embodiments as a low-cost option for solar photovoltaic or optoelectronic materials. According to various embodiments a variety of metal halide perovskites, particularly those with a chemical formula of $APbX_3$, where X is generally a halide (F−, Cl−, Br−, I−) anion with larger organic or inorganic cations A such as $Cs^+$, $CH_3NH_3^+$($MA^+$) or $CH(NH_2)_2$+($FA^+$) may be employed. Metal halide perovskites nanoparticles have demonstrated high luminescence efficiency, excellent color purity and outstanding color tunability to cover a full range of visible emission spectra simply by varying cation or halide compositions. Various embodiments solve problems of instability under external stresses (heat, light and/or water or oxygen in ambient condition) that has been associated with metal halide perovskites.

Details of the Polymer Matrix for Higher Temperature Methods

Various embodiments may employ an even more stable polymer matrix to protect the vulnerable metal halide perovskites. For example, poly(ethylene terephthalate) (PET) has been widely used in the display industry due to its unique physical and mechanical properties. However, using the previously reported swelling-deswelling microencapsulation strategy to convert PET into a perovskite polymer composite is difficult because the swelling ratio is fairly low, as PET normally shows high crystallinity, tight structure, and alack of reactive groups.

The polymer matrix may include a polymeric material selected from the group including but not limited to poly (ethylene terephthalate) (PET), poly(methyl methacrylate) (PMMA), polyethylene naphthalate (PEN), and silicone.

The polymer matrix may have various form factors, including but not limited to films, fibers, or powders.

Details of Contacting with Solvent in Higher Temperature Methods

The solvent may be a polar solvent able to dissolve the perovskite precursor. The solvent may be selected from the group including but not limited to dimethylformamide (DMF), dimethyl sulfoxide (DMSO), N-methyl-2-pyrrolidone (NMP), dimethylpropyleneurea (DMPU), and 1,3-Dimethyl-2-imidazoidinone (DMI).

The step of contacting the solid material comprising the polymer matrix with the solution comprising the perovskite precursor may include immersing the solid material into the solution. According to various embodiments, the method may include a step of heating the solution. For example, the solution may be heated or pre-heated to a temperature of at least about 160 degrees Celsius. In this context, heating means applying energy during the contacting step to bring the solution to the desired temperature; and pre-heating means applying energy before the contacting step. When the solution is heated during the contacting step takes longer. For example, the solid material may be immersed into the solution for a time period of at least about 1 hour. When the solution is pre-heated, less contacting time may be required. For example, the solid material may be immersed into the solution for a time period of at least about 1 minute.

Details of the Anti-Solvent in Higher Temperature Methods

According to various embodiments the optional step of contacting the swollen solid material with an antisolvent may be employed. The antisolvent may be at a temperature of about 85 degrees Celsius. The antisolvent may be a non-polar solvent unable to dissolve the perovskite nanocrystals. The antisolvent may be selected from a group including but not limited to toluene, chloroform, and isopropyl alcohol (IPA). The step of contacting the swollen solid material with the antisolvent may include immersing the swollen solid material into the antisolvent. For example, the swollen solid material may be immersed into the antisolvent for a time period of at least about 1 minute.

Details of Annealing in Higher Temperature Methods

According to various embodiments, the annealing step may be conducted at an annealing temperature of at least about 25 degrees Celsius for an annealing time period of at least about 0.5 hours. The annealing temperature may be in a range of from about 25 to about 120 degrees Celsius. The annealing time period may be in a range of from about 0.5 to about 10 hours. The annealing step may drive the solvent out of the swollen solid material. During the annealing step, the perovskite precursors in the polymer matrices may crystallize to form high quality, well-dispersed luminescent perovskite nanocrystals. The polymer matrix may shrink from its swollen state to an unswollen state. The unswollen polymer matrix may serve as a protective barrier layer around the perovskite nanocrystals, isolating them from the surrounding environment, which may include water and oxygen.

Composites Produced by Higher Temperature Methods

Various embodiments provide an improved process of swelling-deswelling microencapsulation that leads to bright and ultra-stable red and green perovskite polymer composites. The obtained materials have excellent color tunability, color purity, and superior water-/photo-stability.

Various embodiments may provide perovskite-polymer composite films with high Photoluminescence (PL) efficiency, excellent color purity and unprecedented stability against heat and water exposure. Various embodiments may provide perovskite-polymer composites with smaller size perovskite nanocrystals embedded, and the nanocrystals are more uniformly dispersed in the polymer matrix. According to various embodiments, the nanocrystals may have an average size within the range of from about 5 nm to about 20 nm.

Applications of Composites Produced by Higher Temperature Methods

Color-tunable perovskite-polymer composites may be achieved, according to various embodiments, through a simple, cost effective process. The achieved perovskite-polymer composites demonstrate high efficiency, good color purity and excellent stability even without additional barrier layer. Development of ultra-stable green and red perovskite-polymer composites can pave the way for perovskite down-converters to be utilized in display, lighting, radiation detection, luminescent solar concentrator, or smart textile applications.

The application of composites according to various embodiments may be LED downconverters or emitters in display and solid-state lighting areas, plastic scintillators in radiation detection, luminescent solar concentrator, or smart textile applications.

Working with blue LEDs, tunable downconverters with narrow emission peaks should provide the most cost-effective approach for fine spectral control. While quantum dot downconverter materials have shown promise for fine spectral tailoring and wide color gamut displays, their manufacturing cost remains to be lowered and their stability needs to be further enhanced. The perovskite-polymer composites according to various embodiments offer widely-tunable highly-saturated colors and superior stability against external stimulus, which hold great promise to be adopted as a low-cost, high-quality replacement for the traditional, expensive downconverters in displays and beyond.

EXAMPLES

Introduction

The following examples are put forth to provide those of ordinary skill in the art with a complete disclosure and description of how to perform the methods, how to make, and how to use the compositions and compounds disclosed and claimed herein. Efforts have been made to ensure accuracy with respect to numbers (e.g., amounts, temperature, etc.), but some errors and deviations should be accounted for. The purpose of the following examples is not to limit the scope of the various embodiments, but merely to provide examples illustrating specific embodiments.

Example 1: Materials and Methods

Polystyrene (PS) substrates were purchased. Polycarbonate (PC) films, acrylonitrile-butadiene-styrene (ABS) films, cellulose acetate (CA) films, polyvinyl chloride (PVC) films and polymethylmethacrylate (PMMA) sheets were. $RNH_3X$ ($CH_3NH_3$=MA) was purchased from Luminescence Technology Corp. $PbX_2$) and N, N-Dimethylformamide (DMF, were purchased from Sigma-Aldrich.

Characterizations

Fluorescence images were taken using an Olympus BX51 microscope. Light source of 450 nm-480 nm was used for excitation. SEM characterizations performed with a high resolution field-emission scanning electron microscope (Philips-FEI XL30-SFEG). All samples for SEM measurements were coated with Au. Transmission electron microscope (TEM) analyses on the cross-sections of the $MAPbBr_3$-polymer composite films were carried out using FEI Tecnai F30 TEM. The cross-sectional samples were prepared using FEI 200 TEM focused-ion-beam (FIB) instrument.

The photoluminescence quantum yield (PLOY) of the films was measured by the integrating sphere method. An intensity-modulated 409 nm laser beam was used for excitation. The blank sample of each polymer substrate was firstly measured, and the absorption effect of the polymer films was deducted when calculating the PLOY. All the PLOY measurements were carried out in air at room temperature.

Ultraviolet-visible absorption spectra were recorded on a CARY 300 Bio spectrophotometer at room temperature. The steady-state PL of $MAPbBr_3$-polymer films was measured using Horiba Nanolog Spectrofluorometer.

Stability Tests

For water stability test, all $MAPbBr_3$-polymer composites without further protection were immersed in water at room temperature for two months.

For temperature-dependent PL measurements, laser excitation at 457 nm (Argon laser: Stellar-Pro Select 150) was used and the $MAPbBr_3$-polymer films were in-situ heated on the stage whose temperature was controlled by a temperature controller (Linkam TMS 94). Photoluminescence spectra were measured by an Ocean Optics Spectrometer (USB 2000+).

For boiling water test, $MAPbBr_3$—PS and $MAPbBr_3$—PC composites were put into boiling water and last for about 20 seconds, 10 minutes, and 30 minutess respectively, before they were taken out, and cooled down to room temperature for optical microscope, UV-Vis absorption spectra, and PLOY characterizations (see Table E).

Example 2: Synthesis of Perovskite-Polymer Composites Listed in Table A

Perovskite-polymer composites: MABr (MA=CH$_3$NH$_3$) and PbBr$_2$ (3:1 molar ratio) with overall concentration of 5 mg/ml, 10 mg/ml, 20 mg/ml, 50 mg/ml or 80 mg/ml were prepared in DMF with overall volume of 5 ml while stirring for overnight before use. MAPbBr$_3$ solutions were processed onto different polymer substrates (including Polystyrene (PS), Polycarbonate (PC) films, acrylonitriie-butadiene-styrene (ABS) films, cellulose acetate (CA) films, polyvinyl chloride (PVC) films and polymethyimethacryate (PMMA) sheets, Polyurethane (PU)) to form MAPbBr$_3$—PS, MAPbBr$_3$—PC, MAPbBr$_3$-ABS, MAPbBr$_3$—CA, MAPbBr$_3$—PVC and MAPbBr$_3$—PMMA through cotton swab painting or spin-coating at 3000 rpm, followed by baking at 80° C. for 2 hours inside glovebox. Swelling occurred once the precursor solutions were brought into contact with polymer substrate, either through simple cotton swab painting or spin-coating in a more controllable manner. Upon subsequent annealing of the substrates, visible color changes from transparent (for most polymers) or semiclear (for ABS film) to light green were observed, indicating OIP phase formations along with solvent evaporation and polymer deswelling.

TABLE A

Highly Stable MAPbBr3-Polymer Composites

Figures 6A, 6B, 6C, 6D, 6E, 6F, 6G, 6H, 6I, 6J:
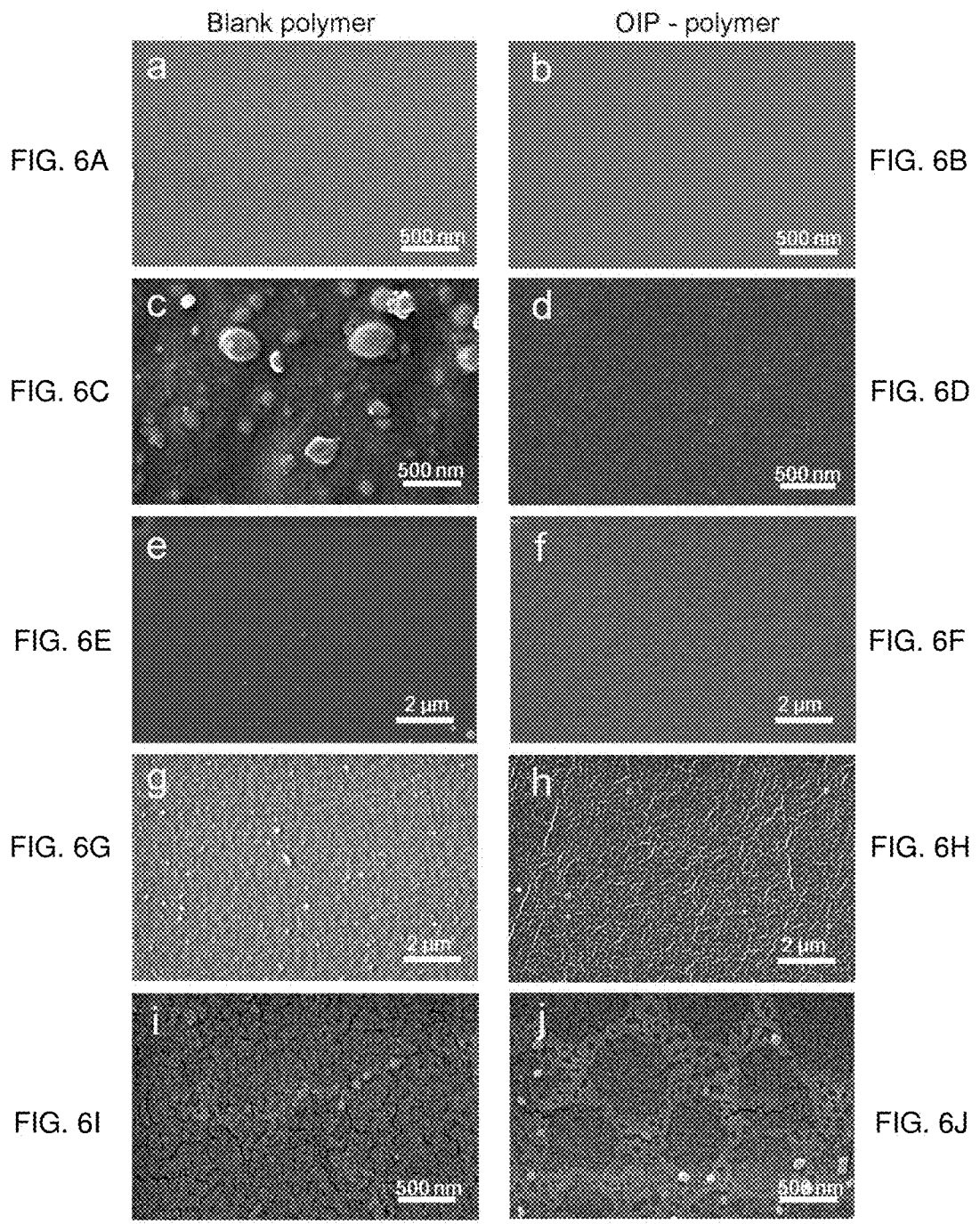
FIG. 6A-6J. SEM top view images of blank substrate polymers and MAPbBr3-polymer composites.
Figures 7A, 7B:
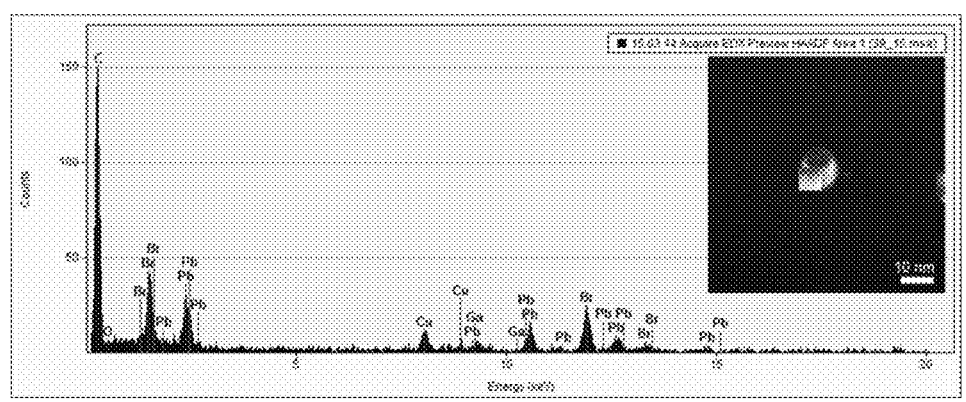
FIG. 7A-7B. EDS characterization of single MAPbBr$_3$ nanoparticle.
Figure 9A:
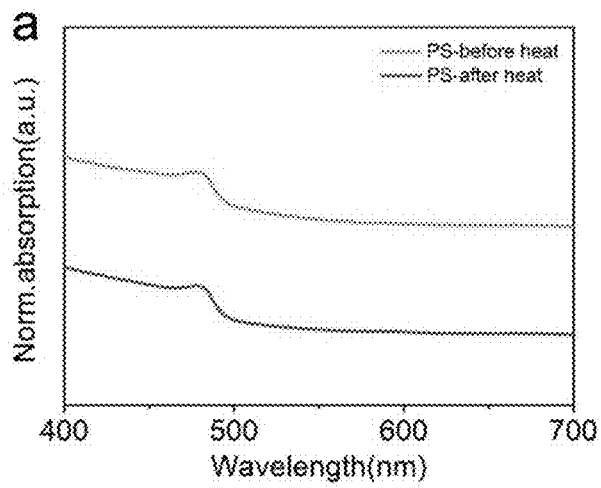
FIG. 9A-9C. UV-Vis spectra of the MAPbBr$_3$-polymer composites before and after heating.
Figure 9B:
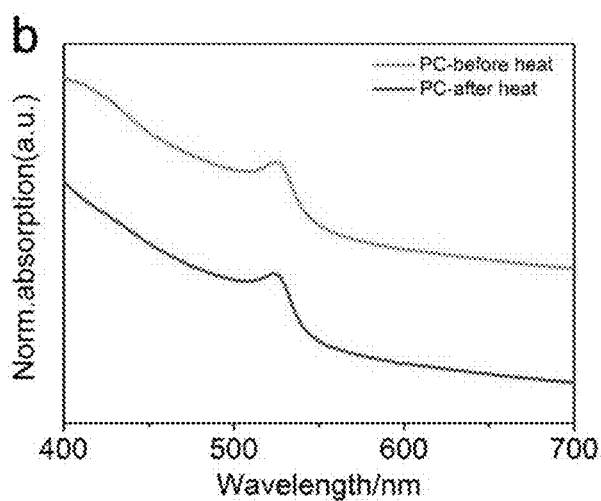
Figure 9C:
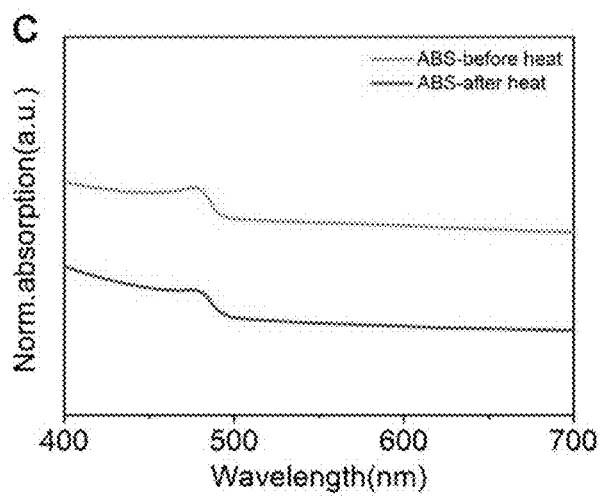
Figure 10A:
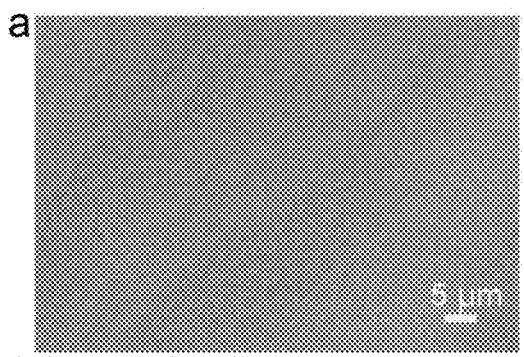
FIG. 10A-10F. Water boiling effect characterizations.
Figure 10B:
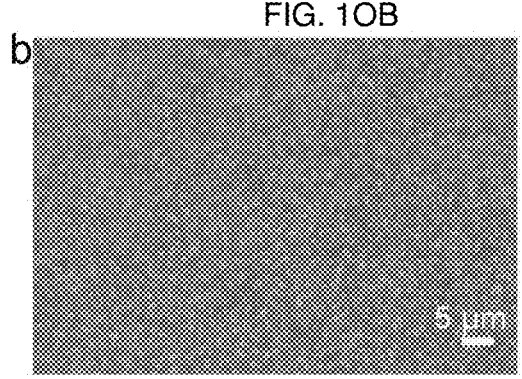
Figure 10C:
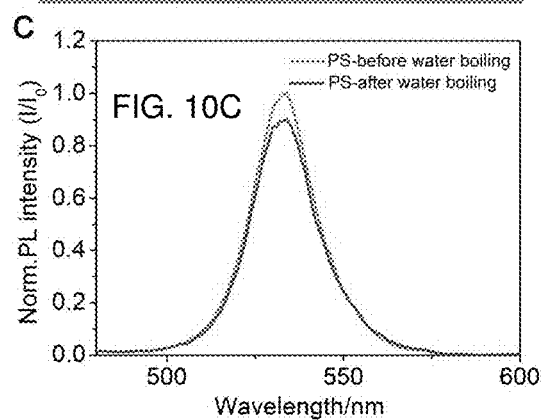
Figure 10D:
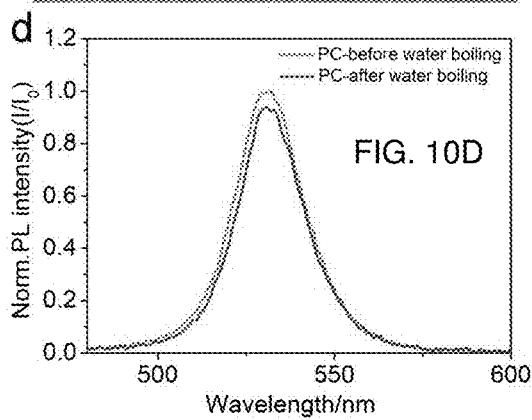
Figure 10E:
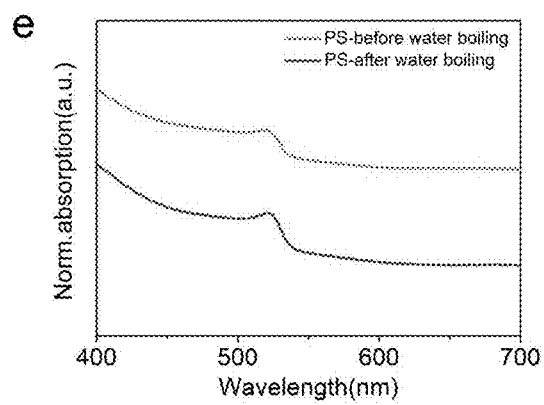
Figure 10F:
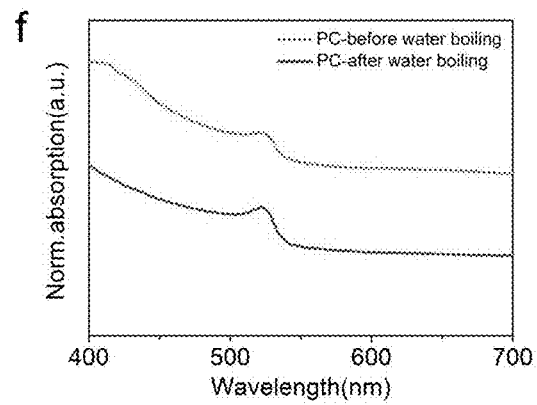
Figure 11A:
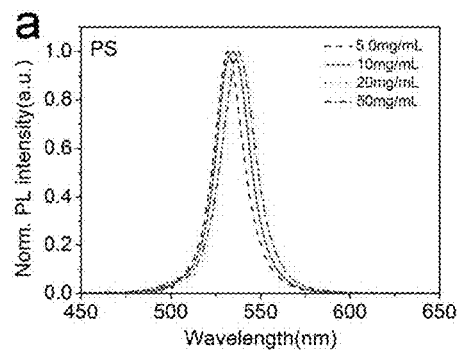
FIG. 11A-11F. Concentration-dependent PL emission spectra of perovskite/polymer composites.
Figure 11B:
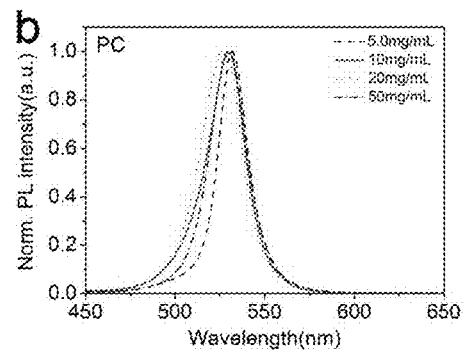
Figure 11C:
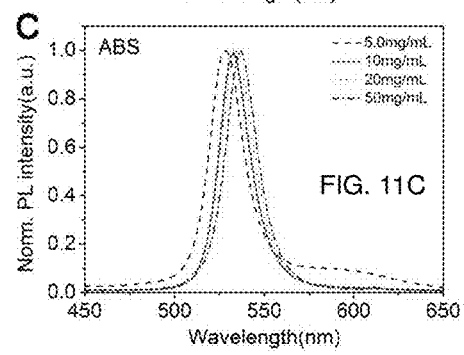
Figure 11D:
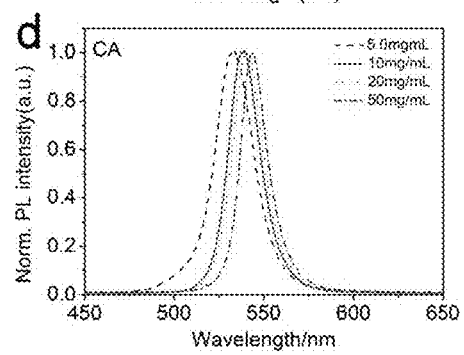
Figure 11E:
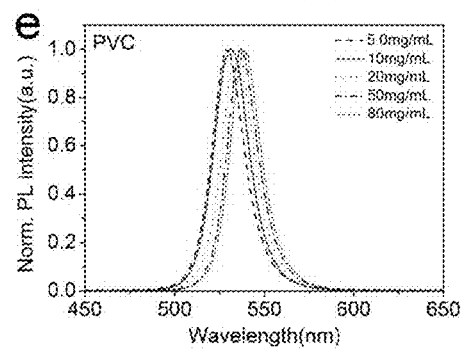
Figure 11F:
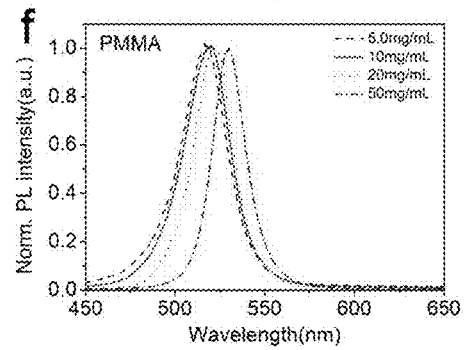

| Type of MAPbBr$_3$-Polymer Composite | Data |
|---|---|
| MAPbBr$_3$-PS | FIG. 1B$_1$; FIG. 1C$_1$; FIG. 1D-1H; FIG. 2A; FIG. 2G; FIG. 3A-3B; FIG. 7A-7B; FIG. 8A. FIG. 9A; FIG. 10A; FIG. 10C; FIG. 10E; FIG. 11A |
| MAPbBr$_3$-PC | FIG. 1B$_2$; FIG. 1C$_2$; FIG. 2B; FIG. 2H; FIG. 3A; FIG. 3C; FIG. 6A-6B; FIG. 8B; FIG. 9B; FIG. 10B; FIG. 10D; FIG. 10F; FIG. 11B |
| MAPbBr$_3$-ABS | FIG. 1B$_3$; FIG. 1C$_3$; FIG. 2C; FIG. 2I; FIG. 3A; FIG. 3D; FIG. 5B; FIG. 6C-6D; FIG. 8C; FIG. 9C; FIG. 11C |
| MAPbBr$_3$-CA | FIG. 1B$_4$; FIG. 1C$_4$; FIG. 2D; FIG. 2J; FIG. 3A; FIG. 5C; FIG. 6E; FIG. 6F; FIG. 11D |
| MAPbBr$_3$-PVC | FIG. 1B$_5$; FIG. 1C$_5$; FIG. 2E; FIG. 2K; FIG. 3A; FIG. 5D; FIG. 6G-6H; FIG. 11E |
| MAPbBr$_3$-PMMA | FIG. 1B$_6$; FIG. 1C$_6$; FIG. 2F; FIG. 2L; FIG. 3A; FIG. -5E; FIG. 6I-6J; FIG. 11F |

CdSe based red quantum dots were synthesized following reported methods [Liu, W. H.; Breen, C.; Method of making quantum dots. International Patent Application Number: PCT/US2012/066140; Publication Number: WO 2013/078245 A1.]. Quantum dots in chlorobenzene were spin coated at 3000 rpm on a PC film to obtain the red luminescent film.

Example 3: Characterization of MAPbBr$_3$-Polymer Composites

All MAPbBr$_3$-polymer composites were obtained either with cotton swab painting (FIG. 1B) or spin coating (FIG. 1C), and were highly luminescent under UV excitations. Microscopic characterizations of MAPbBr$_3$—PS composites provided evidence of swelling-deswelling microencapsulation. When adjusting the focal plane of fluorescence microscopy to ~4 μm underneath the top surface of the MAPbBr$_3$—PS sample, uniformly distributed nanoparticles over large area were observed (FIG. 1D), while focusing on the top surface yields no particle-like features. Scanning electron microscopy (SEM) characterizations of the PS sample surfaces before (FIG. 1E) and after (FIG. 1F) MAPbBr$_3$ processing showed identically smooth morphology with no visible OIP crystals on top, confirming that the nanocrystals observed in fluorescence microscopy are mainly embedded inside the polymer matrix and the substrate surface itself has fully recovered through the deswelling process. Similar embedded nanoparticles were also observed for MAPbBr$_3$—PC, MAPbBr$_3$—CA and MAPbBr$_3$—PVC composites (FIGS. 5A-5B and FIGS. 6A-6J). For semiclear MAPbBr$_3$-ABS, no particle-like features can be observed in fluorescence microscopy (FIG. 5B), mainly due to the highly scattering nature of ABS polymers, but SEM indicates the originally rough ABS surface has been smoothed out after the spin coating process (FIG. 6C and FIG. 6D). For MAPbBr$_3$—PMMA, nanoparticles were observed on the surface in both fluorescence microscopy and SEM images, probably due to relatively low swelling ratio of PMMA in DMF solvent.

Cross-sectional transmission electron microscopy (TEM) image (FIG. 1G) of the MAPbBr$_3$—PS sample (Table B) showed well dispersed crystalline nanoparticles closely passivated within the amorphous PS substrate matrix. From the HRTEM (FIG. 1H) and the fast Fourier transformation (FFT) image (inset of FIG. 1H), interplanar distances of 2.9 Å and 4.1 Å corresponding to (200) and (110) crystal faces of MAPbBr$_3$ crystal were identified. The energy-dispersive spectroscopy (EDS) measurement shows the nanoparticle has a Br/Pb molar ratio of 2.8:1 (FIG. 7A-7B), being in accordance with the stoichiometry of MAPbBr$_3$. In this swelling-deswelling strategy, MAPbBr$_3$ crystallization, nanocrystal dispersion and polymer passivation occurs simultaneously, leading to nanoparticles that are protected from the external stress marvelously well.

TABLE B

Pb and Br atomic ratio of MAPbBr$_3$ dispersed in PS

| Element | Weight (%) | Atomic (%) | Uncert. (%) | Correction | k-Factor |
|---|---|---|---|---|---|
| Br | 51.83 | 73.61 | 2.34 | 0.99 | 2.432 |
| Pb | 48.16 | 26.38 | 2.79 | 0.99 | 4.409 |

FIG. 2A-2F illustrates the static and transient photoluminescence (PL) behavior and absorption spectra of the spin-coated MAPbBr$_3$-polymer composite films. The abrupt absorption onsets and emission peaks centered around 528~533 nm correspond well with the band-to-band transition of bromide perovskite. Their full-widths-half-maxima (FWHM) range between 18 nm to 24 nm (Table C).

TABLE C

Peak wavelength and Full Width at Half Maximum (FWHM) of Photoluminescence spectra of MAPbBr$_3$-polymer composites

| Substrate | Wavelength (nm) | FWHM (nm) |
|---|---|---|
| PS | 532 | 18 |
| PC | 531 | 23 |
| ABS | 528 | 20 |
| CA | 533 | 24 |
| PVC | 531 | 23 |
| PMMA | 532 | 18 |

The PLQYs of these films in Table D can reach can reach as high as ~48%, for MAPbBr$_3$-ABS composites, which is the highest value for reported MAPbBr$_3$ solid composite films to the best of our knowledge.

TABLE D

PL radiative lifetime of various MAPbBr$_3$-polymer composites

| Substrate | $T_1$ (ns) | $f_1$ (%) | $T_2$ (ns) | $f_2$ (%) | $T_{avg.}$ (ns) | PLQY (%) |
|---|---|---|---|---|---|---|
| PS | 198.32 | 52.78 | 57.35 | 47.22 | 131.75 | 33 |
| PC | 194.45 | 60.84 | 47.79 | 39.16 | 137.02 | 31 |
| ABS | 673.8 | 67.44 | 146.9 | 32.53 | 502.24 | 48 |
| CA | 337.9 | 60.62 | 57.69 | 39.38 | 227.55 | 47 |
| PVC | 499.0 | 71.89 | 136.3 | 28.11 | 397.05 | 16 |
| PMMA | 26.80 | 47.25 | 4.37 | 52.75 | 14.97 | 14 |

$T_1$: slow PL lifetime,
$T_2$: fast PL lifetime,
$T_{avg.}$: average PL lifetime Photoluminescence radiative lifetimes are commonly taken as a hallmark of perovskite film quality, with longer decay lifetimes used as indicators of better performing materials. For MAPbBr$_3$ based solid films or even colloidal nanoparticles, the average radiative lifetimes ($\tau_{avg}$) are usually within 10-100 ns. Remarkably, most MAPbBr$_3$-polymer composites of the present invention showed long $\tau_{avg}$ ranging from 130 ns (for MAPbBr$_3$—PS) to 502 ns (for MAPbBr$_3$-ABS), with the only exception of MAPbBr$_3$—PMMA sample giving out a $\tau_{avg}$ of ~15 ns, which has the MAPbBr$_3$ nanocrystals on surface (Table D).

Good nanoparticle dispersion and polymer passivation were seen. Most MAPbBr$_3$-polymer composites exhibited stability against water and heat attack. No observable PL decay happened for most MAPbBr$_3$-polymer composites upon exposure to ambient air for five months, except MAPbBr$_3$—PMMA, which degraded within an hour. To accelerate the test of water/moisture stability, the samples were put directly into water with their PL monitored periodically under UV illumination (FIG. 3A). The MAPbBr$_3$—PS, MAPbBr$_3$—PC, MAPbBr$_3$—PVC and MAPbBr$_3$—ABS films immersed in water for 2 months revealed less than 10% decay in luminescence intensity, indicating predominant water stability. As for MAPbBr$_3$—CA film, the brightness decayed to 5% of initial value after 48 hours, probably because of the relatively higher water permeability of CA. While MAPbBr$_3$—PMMA became non-luminescent right after being put into water since the MAPbBr$_3$ crystals on surface were washed out right away.

The thermal stability of those water stable MAPbBr$_3$-polymer composites were then tested by heating up to high temperature and cooling back to room temperature while monitoring their PL spectra. Remarkably, the PL intensities (FIG. 3), FWHM and peak wavelength (FIG. 8A-8C) of MAPbBr$_3$—PS and MAPbBr$_3$—PC can fully recover after being heated to 100° C. and 110° C., respectively. Even after heating to 180° C., the MAPbBr$_3$—PC retained ~40% of initial intensity when getting back to room temperature, indicating high thermal stability of these composites even without any special barrier layer protection. As for MAPbBr$_3$-ABS composite film, the decrease of perovskite brightness after cooling back from 100° C. might come from the degradation of ABS substrate, the rubbery phase of which is known to be susceptible to environmental degradation at higher temperature. It is noted that for all three samples, no obvious changes were observed in the UV-Vis absorption peaks and onsets after heating, indicating intact MAPbBr$_3$ nanocrystals (FIG. 9A-9C).

Selected by good water and thermal stability, MAPbBr$_3$—PS and MAPbBr$_3$—PC films were then tested in harsh environment: boiling water. It was observed that these OIP-polymer films remain highly luminescent both in boiling water and after taking out, and the remained morphology, brightness and structure are confirmed by microscopic, PL, and absorption characterizations before and after boiling (FIG. 10A-10F). PLOY characterizations after boiling the samples for 30 minutes showed decay of only less than 7% for MAPbBr$_3$—PC and 15% for MAPbBr$_3$—PS composites (Table D). In comparison, the luminescence of MAPbBr$_3$ films encapsulated with macroscopic PS or PC films were quickly lost in boiling water and can't be recovered.

TABLE E

PLQY of MAPbBr$_3$-PS and MAPbBr$_3$-PC composites boiled in water for different time

| Sample | Time | | | |
|---|---|---|---|---|
|  | 0 s | 10 s | 10 min | 30 min |
| MAPbBr$_3$-PS | 34 | 32 | 30 | 29 |
| MAPbBr$_3$-PC | 31 | 31 | 30 | 29 |

Because of their process simplicity, low cost, high stability, high luminescence efficiency and color purity, these OIP-polymer composite have great potential for various applications. The most immediate usage could be as down-converters for the backlight unit (BLU) of liquid crystal displays (LCDs). For concept demonstration, a green MAPbBr$_3$—PC film and a red CdSe based QD-polymer film were prepared. Under the UV light, these films emit saturate and bright green or red light (FIG. 4A). The "remote-phosphor" approach was applied by using a high power blue LED (450 nm with a FWHM of 20 nm) to pump the green perovskite film and the red QD film. The resultant red (630 nm with a FWHM of 23 nm) and green (532 nm with a FWHM of 18 nm) spectra can be well fitted by the Gaussian function. Overall the system can cover over 100% of the Adobe RGB color gamut and 95% of the Rec. 2020 color gamut, the white point is D65, as is illustrated in FIG. 4D. Compared with all QD approach, our hybrid film has the advantage that the green perovskite emission has narrower linewidth (18 nm) compared with the best green QDs (~30 nm), indicating more saturated green color, which is vital for wider color gamut. The above suggested application is comparable to a state-of-the art quantum dot product: quantum dot enhanced film (QDEF) for company like Nanosys Inc. Besides these QDEF like application. The composite film can also work with blue LED with on chip red phosphor (for example, the narrow band potassium fluorosilicate (PFS) phosphors developed by GE) to form Red, Green and Blue (RGB) components of high color quality white light that are well suited for LCD display backlight applications.

Examples 4-8: Higher Temperature Embodiments

A purpose of Examples 1-5 is to provide those of ordinary skill in the art with a complete disclosure and description of how to perform the higher temperature methods according to various embodiments, how to make, and how to use the perovskite-polymer composites disclosed and claimed herein.

Example 4

Figure 12C:
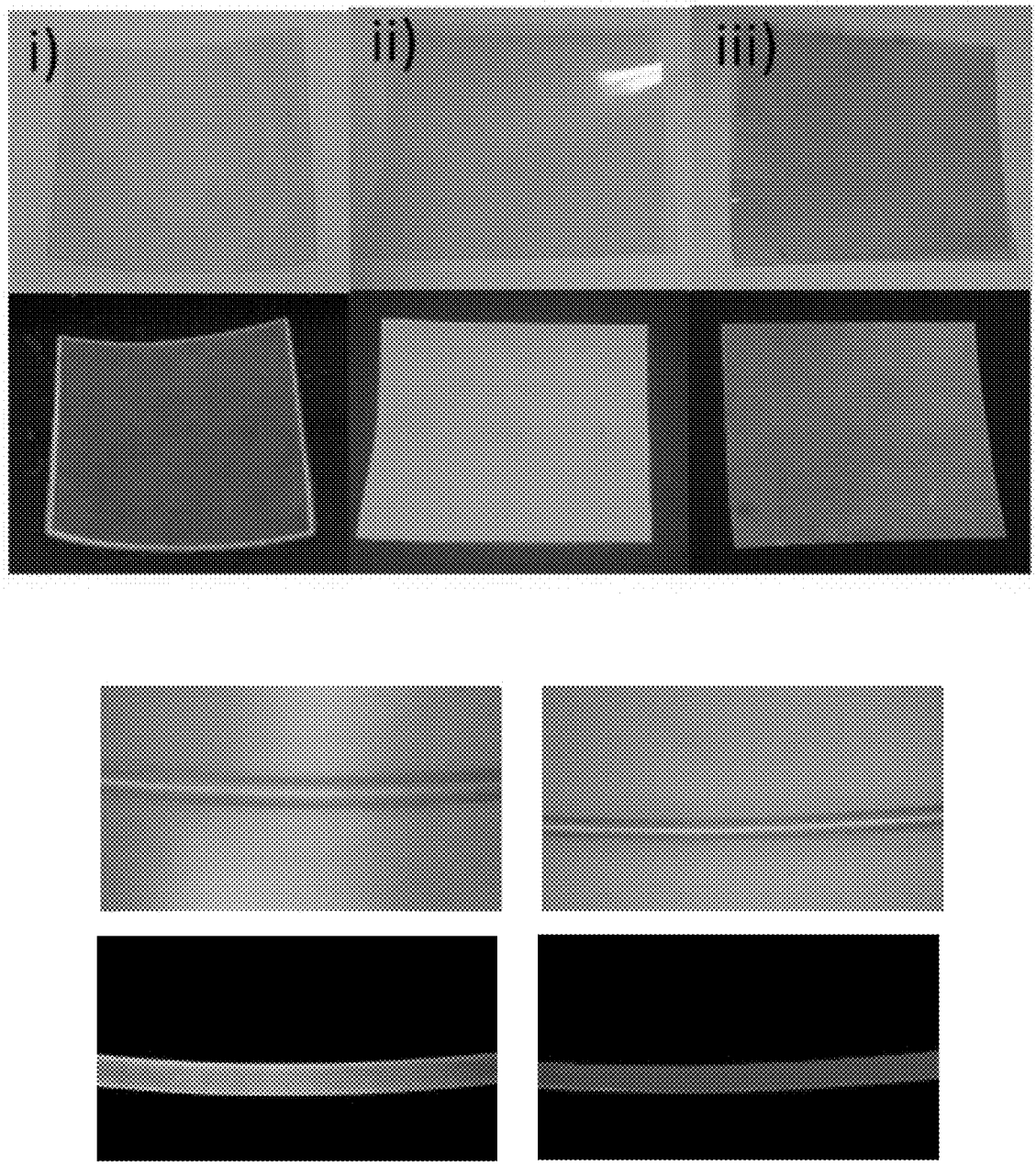
FIG. 12C is an example according to various embodiments, providing photograms of perovskite-polymer composite films of different colors under ambient light.
Figure 12D:
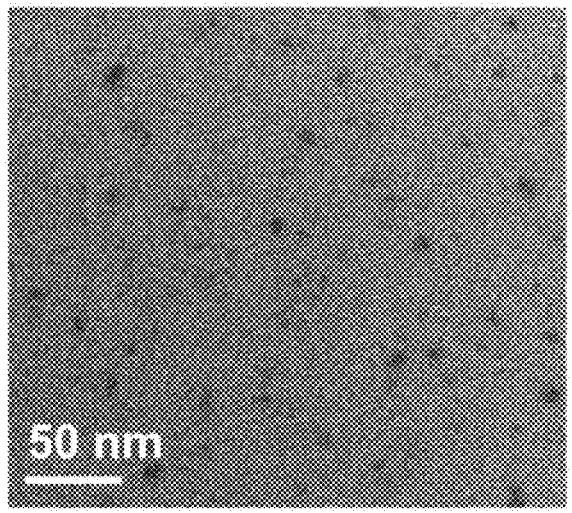
FIG. 12D is an example according to various embodiments illustrating a transmission electron microscopy (TEM) image showing the nanocrystals formed in swelling-deswelling process according to various embodiments.
Figure 12E:
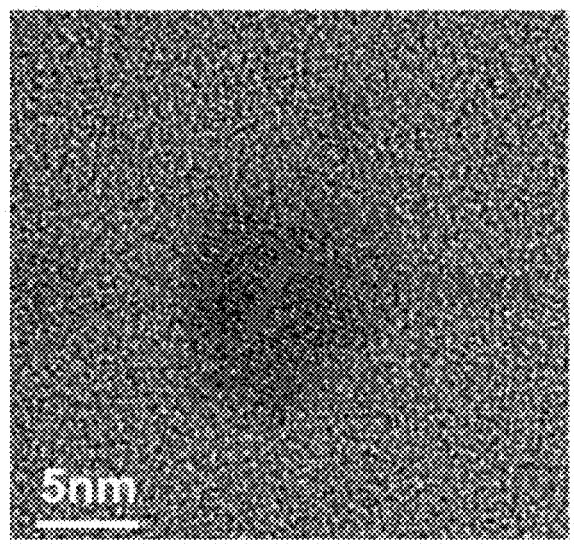
FIG. 12E is an example according to various embodiments illustrating a high resolution TEM (HRTEM) image showing the nanocrystals formed in swelling-deswelling process according to various embodiments.
Figure 12F:
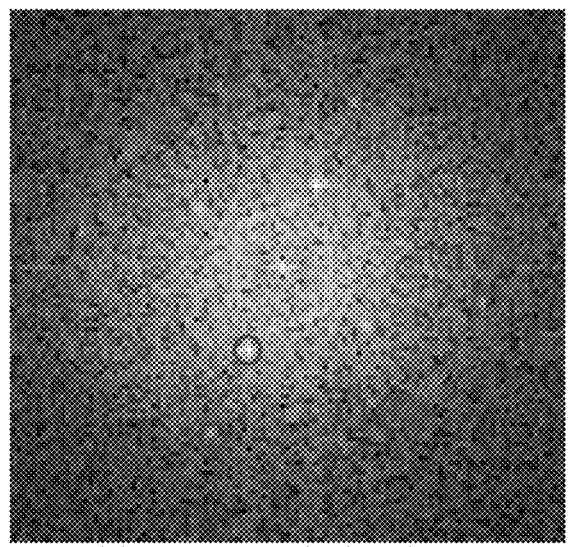
FIG. 12F is an example according to various embodiments illustrating a fast Fourier transformation (FFT) image showing the nanocrystals formed in swelling-deswelling process according to various embodiments.

According to the procedure schematically shown in FIG. 12A, commercial PET matrices were immersed into the metal halide perovskite precursor (CsX/MAX and $PbX_2$, X=Cl−, Br−, I−) solution and heated to a temperature of about 160 degrees Celsius. It was observed that the PET polymer chains swelled and expanded under this condition, letting in solvents and solutes. Next, a deswelling process comprising annealing was applied to drive out the solvent. During the deswelling process, the perovskite precursors started to nucleate, and nanocrystals formed inside the polymer. The luminescent films illustrated in FIG. 12C were achieved. More specifically, FIG. 12C is an example according to various embodiments, providing photograms of perovskite-polymer composite films of different colors under ambient light. The images show ultrastable perovskite-polymer composite films of different colors under ambient light (upper) and 395 nm UV light (lower) excitation. The specific perovskite precursor compositions are i) $CsPbCl_1Br_2$, ii) $CsPbBr_3$, and iii) $CsPbBr_{0.75}I_{2.25}$. The transmission electron microscopy (TEM) characterization in FIG. 12D showed the nanocrystals size formed in this process is smaller than previous room temperature swelling-deswelling process, and the size distribution is more uniformly controlled in 5~20 nm. And by focusing on individual particles, the high resolution TEM (HRTEM) in FIG. 12E and fast Fourier transformation (FFT) images in FIG. 12F demonstrate interplanar distances of 4.01 Å and 1.88 Å, which are close to the ($\bar{1}$10) plane d-spacing (4.10 Å) and the (103) plane d-spacing (1.86 Å) of monoclinic $CsPbBr_3$ structure (PDF #18-0364).

Example 5

Figure 13:
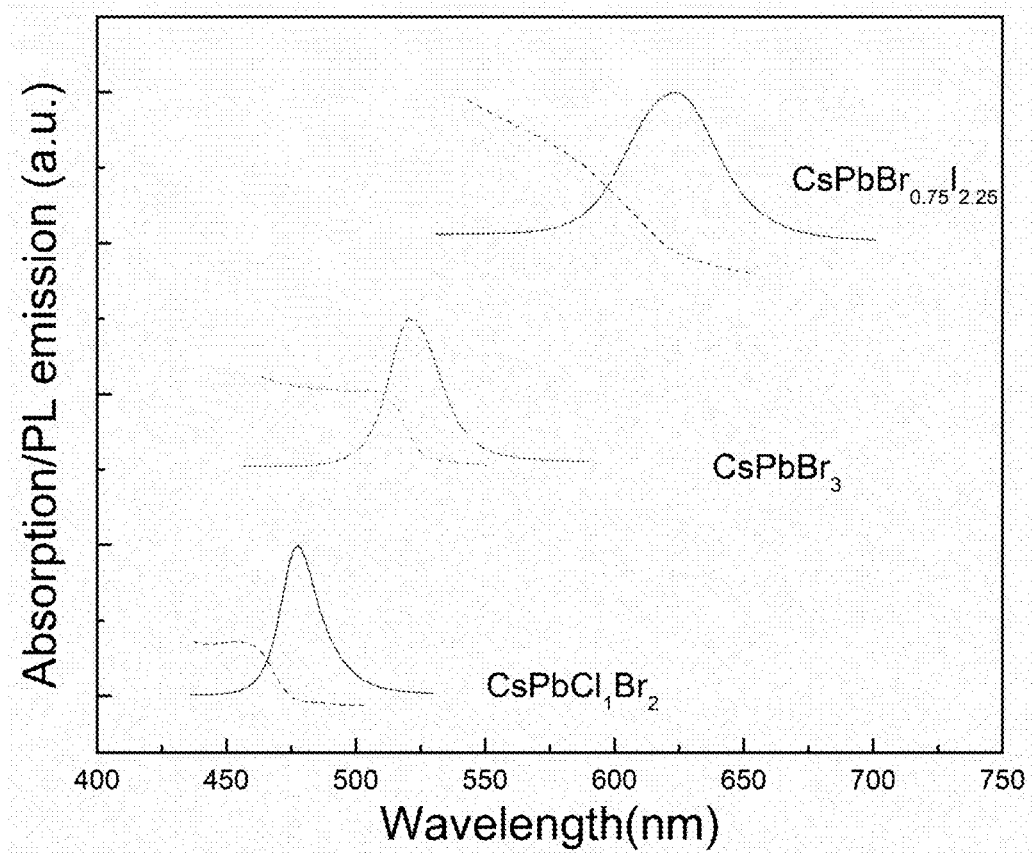
FIG. 13 is an example according to various embodiments, illustrating a plot of UV-vis (dotted line) and PL emission (solid line) for three CsPbX$_3$ perovskite-polymer composite film spectra versus wavelength.

FIG. 13 is an example according to various embodiments, illustrating a plot of absorption/PL emission versus wavelength for series of $CsPbX_3$-PET samples prepared according to the procedure described in Example 4. Since the process according to various embodiments is generic, it can be applied to $CsPbX_3$ or $MAPbX_3$ precursor solutions with different halide compositions (X=Cl, Br, I) to achieve widely tunable bandgaps. As depicted in FIG. 13, a series of $CsPbX_3$-PET samples were synthesized through anion tuning, where vivid colors were observed under UV exposure. The $CsPbBr_3$ sample exhibited pure green emission. By increasing the stoichiometric ratio of chloride and iodide precursors, the emission may be shifted to shorter and longer wavelengths, respectively, and the entire visible range may be covered.

Example 6

Various $ABX_3$ precursor solutions (in which A was $Cs^+$ or $MA^+$, B was $Pb^{2+}$, X was Cl−, Br−, I− or their mixture) were prepared by dissolving AX and $BX_2$ with different ratios in DMF or DMSO. Commercial polymer matrices (e.g. PET) were immersed into the perovskite precursor solution and heated up to a relatively high temperature of from about 160 to about 170 degrees Celsius for a period of time. When putting the polymer matrices into pre-heated solvents in an open container (e.g. beakers), the immersion time was from about 1 to about 10 minutes. When a 20-ml autoclave was used as the container, the immersion time was from about 1 to about 1.5 hours. Under such conditions, solvent penetrated into the polymer and swelled the polymer sufficiently, bringing the solutes into the polymer host. After fully swelled, the polymer was immersed into moderate temperature (e.g. 85 degrees Celsius) antisolvent (such as toluene) for about 0 to about 10 minutes, and then annealed on a hot plate at 80 degrees Celsius for about 1 to about 10 hours. Consequently, bright perovskite polymer composites were obtained. The perovskite polymer composites exhibited excellent optical properties, with outstanding color purity and tunability.

Optical characterizations reveal the outstanding color purity and tunability of these perovskite-polymer composites. Photoluminescent (PL) spectra of the samples and UV-vis absorption spectra were plotted in FIG. 13. The emission colors may be tuned from blue (477 nm were demonstrated) to red (645 nm were demonstrated) with a full width at half maximum ranging from 17.7 nm to 41.8 nm. Among them, the pure green-emitting $MAPbBr_3$ perovskite polymer composite manifested a high PL quantum yield of 77.9%. Details of PL quantum yields were listed in Table F. More specifically, Table F shows emission peaks, FWHMs and PLQYs of selected ultrastable perovskite-polymer composite films.

TABLE F

Emissions peaks, FWHMs and PLQYs of selected ultrastable perovskite-polymer composite films.

| Perovskite components | Emission peaks (nm) | FWHM (nm) | PLQY (%) |
|---|---|---|---|
| $CsPbCl_1Br_2$ | 477 | 17.7 | — |
| $CsPbBr_3$ | 520 | 26.5 | 45.7 |
| $CsPbBr_{0.75}I_{2.25}$ | 622 | 41.8 | 28.5 |
| $MAPbBr_3$ | 510 | 29.8 | 77.9 |

Using PET as the polymer substrate, the corresponding perovskite-polymer composites exhibited much enhanced environmental stability even without barrier layer protection.

Example 7

In a preliminary stability test, the perovskite-polymer composite films remain brightly luminescent in water for over 2 years under ambient condition.

Figure 14A:
FIG. 14A is an example according to various embodiments, providing a photograph of a red (CsPbBr$_{0.75}$I$_{2.25}$) perovskite-polymer composite.
Figure 14B:
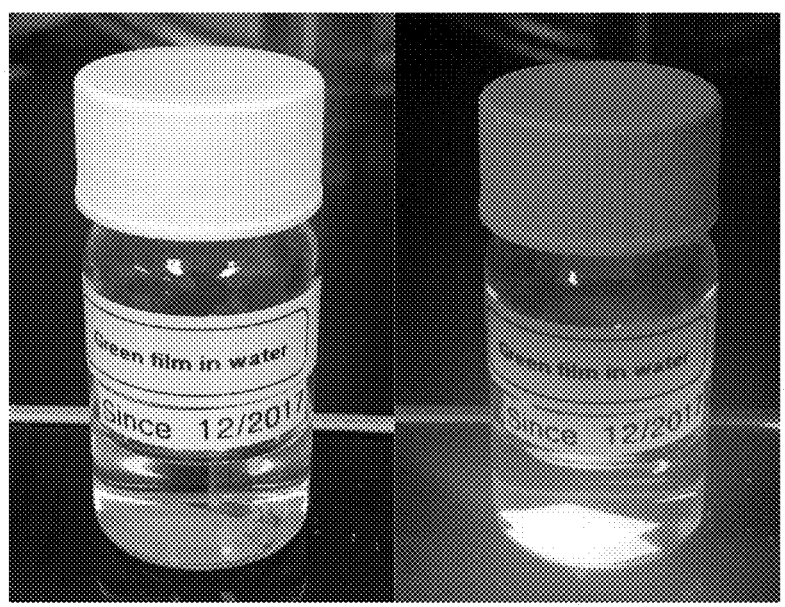
FIG. 14B is an example according to various embodiments, illustrating a green (CsPbBr$_3$) perovskite-polymer composite film after being stored in water for about 3 years.
Figure 14C:
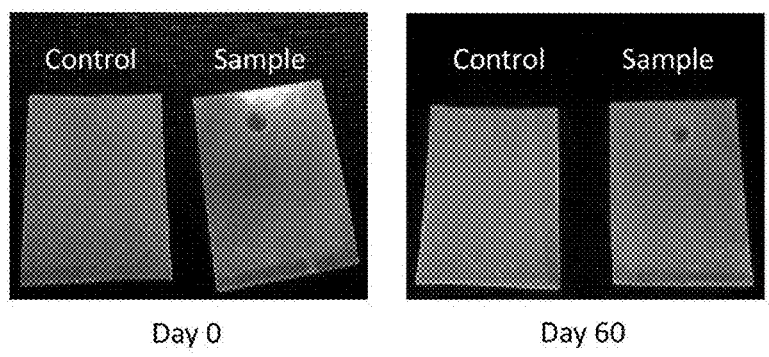
FIG. 14C is an example according to various embodiments, illustrating photographs of a control and a sample perovskite-polymer composite film during different stages of a stability test in a 70° C. and 90% relative humidity (RH) incubator.
Figure 14D:
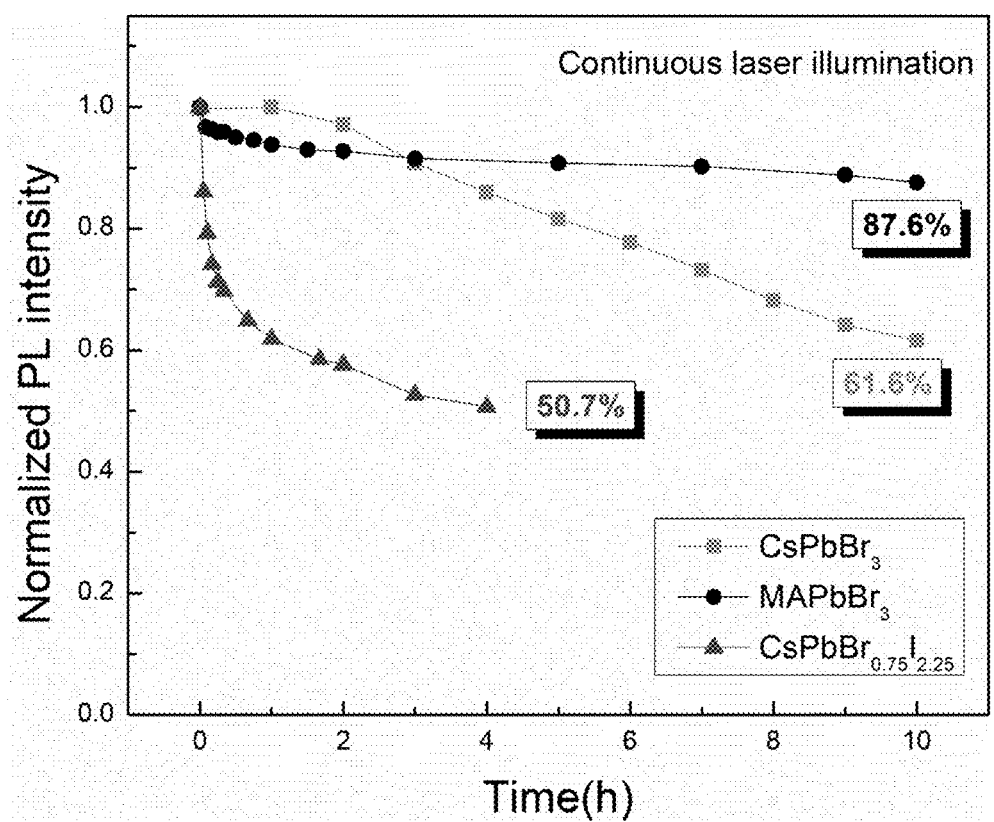
FIG. 14D is an example according to various embodiments, illustrating a plot of normalized PL intensities of corresponding perovskite-polymer composite films under continuous laser illumination over time.

FIG. 14A shows the red ($CsPbBr_{0.75}I_{2.25}$) perovskite-polymer composite. FIG. 14B shows the green ($CsPbBr_3$) perovskite-polymer composite film (stored in water since 2017) synthesized by the strategy under ambient light and UV excitation. FIG. 14C shows pictures of the control and the sample during different stages of the stability test in a 70° C. and 90% RH incubator. The control is stored in dark ambient air while the sample stays in the incubator. After 60 days, there is no visible PL decay of the red perovskite polymer composite sample. FIG. 14D shows normalized PL intensities of corresponding perovskite-polymer composite films under continuous laser illumination.

The red perovskite polymer composite films suffer from poor stability and very dimmed luminescence in the previous room-temperature swelling-deswelling microencapsulation. Here, the perovskite-polymer composites can maintain their PL intensity in a homemade incubator with high temperature and high humidity (70 degrees Celsius and 90% RH) for 60 days without any decay. Moreover, the perovskite-polymer composite films also demonstrate excellent photostability. Under continuous excitation by a relatively intense blue laser (irradiance 100 mW/cm²) for 4 hours, the $CsPbBr_{0.75}I_{2.25}$ perovskite-polymer composites still have 50.7% of its initial PL intensity, and can quickly recover (within 1 minute) to 90% of its initial intensity when the excitation is off. This improved swelling-deswelling microencapsulation strategy not only works for the red ones, but also results in more stable $MAPbBr_3$-based green perovskite-polymer composites. In the same incubator, the $MAPbBr_3$-PET perovskite-polymer composites maintained 80% of their initial PL intensity after sixty days. Illuminating by the same blue laser continuously for 10 hours, the $MAPbBr_3$ green perovskite-polymer composites still have 87.8% of its initial PL intensity, and can fully recover to its initial PL intensity after the laser is turned off.

Without wishing to be bound by theory, the outstanding water and light stability may be ascribed to the protection effect of PET substrate. PET is a typical polymer that performs excellent barrier properties, which can prevent the small molecules such as oxygen, water and some organic molecules from penetrating into the polymer matrix. Therefore, the lifetime of the perovskite nanocrystals that embedded inside of the polymer matrix could be significantly extended.

Example 8

Figure 15A:
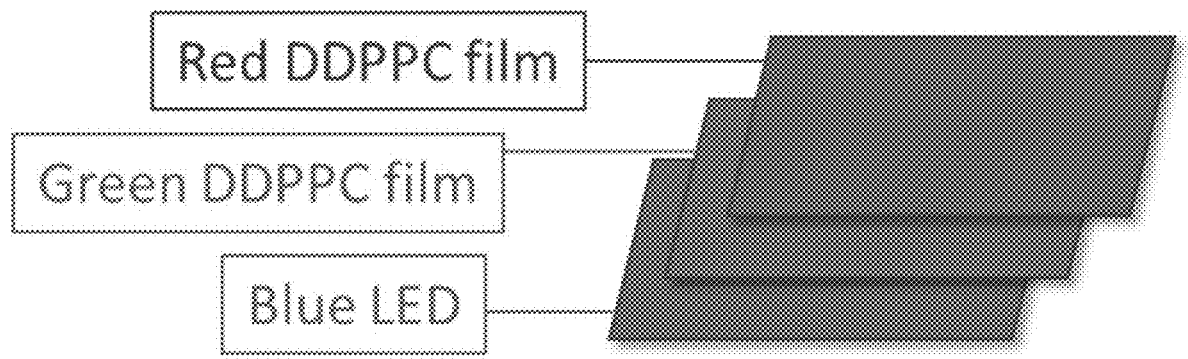
FIG. 15A is an example according to various embodiments, illustrating an application of the ultra-stable perovskite-polymer composite films as down-converting sheets in display backlighting.
Figure 15B:
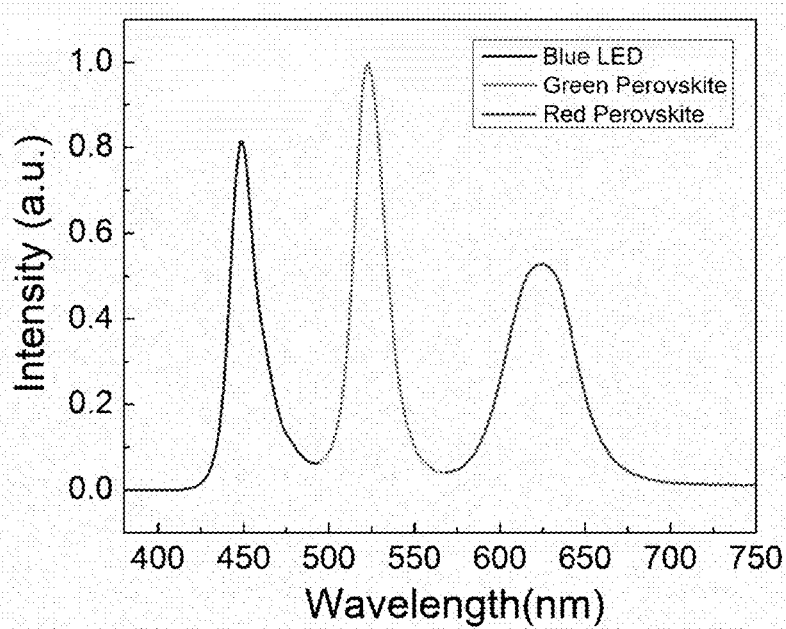
FIG. 15B is an example according to various embodiments, illustrating an emission spectra of a white LED system with green CsPbBr$_3$ perovskite-polymer composite and red perovskite-polymer composite films as downconverters for blue LEDs.
Figure 15C:
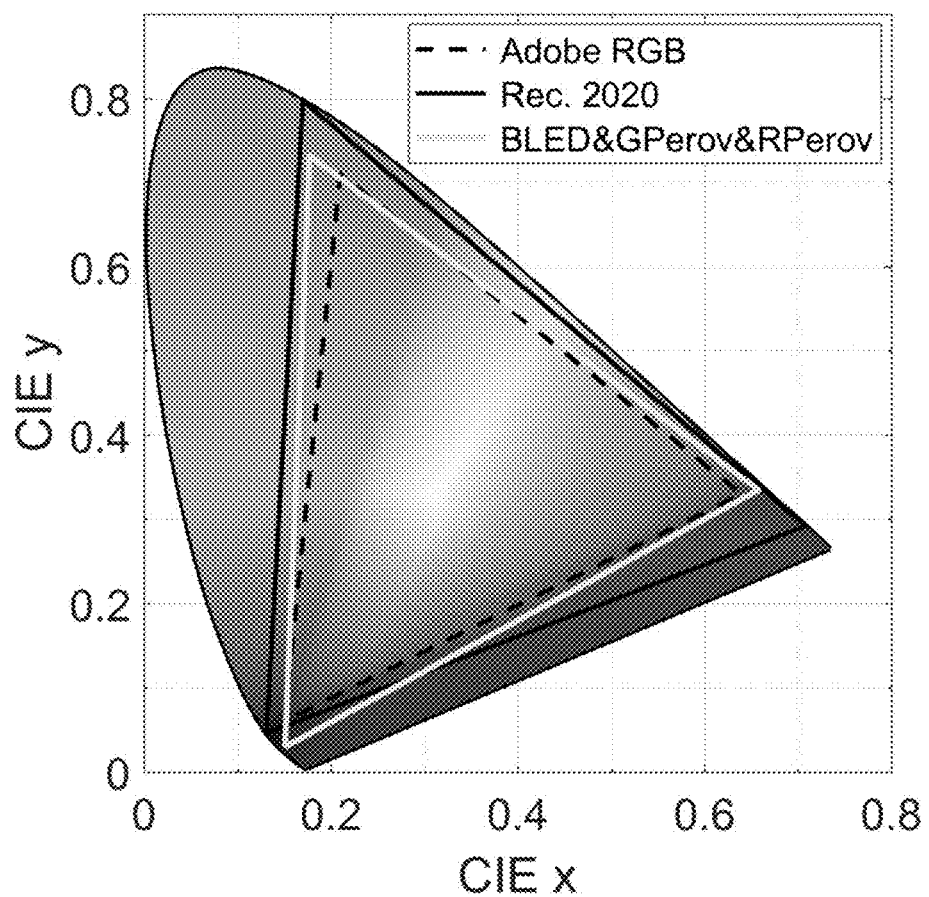
FIG. 15C is an example according to various embodiments, illustrating color gamut coverage of the white LED systems with Adobe RGB and Rec. 2020 standards for comparison in CIE 1931.

FIG. 15A shows an application of the ultra-stable perovskite-polymer composite films as downconverting sheet in display backlighting. FIG. 15B shows emission spectra of a white LED system with green $CsPbBr_3$ perovskite-polymer composite and red perovskite-polymer composite films as downconverters for blue LEDs. FIG. 15C shows color gamut coverage of the white LED systems with Adobe RGB and Rec. 2020 standards for comparison in CIE 1931.

With the advantages of their process simplicity, extremely low cost, high stability, high luminescence efficiency and excellent color saturation, the perovskite polymer composites according to various embodiments hold great potential for many PL-related applications. The most immediate usage would be downconverters in the LCD backlights. For concept demonstration, the red $CsPbBr_{0.75}I_{2.25}$ perovskite polymer composite film was used and green $CsPbBr_3$ perovskite polymer composite film as the downconverter pumped by a high power blue LED was used. Calculation indicates that the spectrum can match that of the CIE standard illuminant D65, as shown in FIG. 15B, and can cover 99.8% of the adobe RGB color gamut and 81.83% of the Rec. 2020 color gamut. Hybridization of the perovskite polymer composite films with other state-of-the art downconverters, such as quantum dots or narrow band phosphors will further enhance the color gamut coverage range. This white light with narrow-band primary colors makes it ideal for LCD backlight.

This is a fundamental material discovery and could potentially be used for various applications. The most immediate usage would be downconverters in the LCD backlights. For concept demonstration, red $CsPbBr_{0.75}I_{2.25}$ perovskite polymer composite film was used and green $CsPbBr_3$ perovskite polymer composite film as the downconverter pumped by a high-power blue LED was used (FIG. 15A). Calculation indicates that the spectrum can match that of the CIE standard illuminant D65, as shown in FIG. 15B, and can cover 99.8% of the adobe RGB color gamut and 81.83% of the Rec. 2020 color gamut (FIG. 15C). Hybridization of the perovskite polymer composite films with other state-of-the art downconverters, such as quantum dots or narrow band phosphors will further enhance the color gamut coverage range. This white light with narrow-band primary colors makes it ideal for LCD backlight.

What is claimed is:

1. A method for producing a perovskite-polymer composite, the method comprising:
    contacting a solid material comprising a polymer matrix with a solution comprising a perovskite precursor, wherein the solution is heated to at least 110 degrees Celsius prior to or after contacting the solid material;
    allowing the solution to penetrate the solid material to yield a swollen solid material comprising the perovskite precursor dispersed within the polymer matrix;
    optionally contacting the swollen solid material with an antisolvent; and
    annealing the swollen solid material to crystallize the perovskite precursor and to yield the perovskite-polymer composite comprising perovskite nanocrystals dispersed in the polymer matrix.

2. The method according to claim 1, wherein the polymer matrix comprises a polymeric material selected from the group consisting of poly(ethylene terephthalate) (PET), poly (methyl methacrylate) (PMMA), polyethylene naphthalate (PEN) and silicone.

3. The method according to claim 1, wherein the solution further comprises a solvent selected from the group consisting of dimethylformamide (DMF), dimethyl sulfoxide (DMSO), N-methyl-2-pyrrolidone (NMP), dimethylpropyleneurea (DMPU), and 1,3-Dimethyl-2-imidazolidinone (DMI).

4. The method according to claim 1, wherein the step of contacting the solid material comprising the polymer matrix with the solution comprising the perovskite precursor comprises immersing the solid material into the solution.

5. The method according to claim 4, wherein the solid material is immersed into the solution for a time period of at least about 1 hour.

6. The method according to claim 1, further comprising a step of heating the solution.

7. The method according to claim 6, wherein the solution is heated to a temperature of at least about 160 degrees Celsius.

8. The method according to claim 1, wherein the solution is pre-heated to a temperature of at least about 160 degrees Celsius.

9. The method according to claim 8, wherein the step of contacting the solid material comprising the polymer matrix with the solution comprising the perovskite precursor comprises immersing the solid material into the solution.

10. The method according to claim 9, wherein the solid material is immersed into the solution for a time period of at least about 1 minute.

11. The method according to claim 1, wherein the antisolvent is at a temperature of about 85 degrees Celsius.

12. The method according to claim 1, wherein the antisolvent is a non-polar solvent unable to dissolve the perovskite nanocrystals.

13. The method according to claim 1, wherein the step of contacting the swollen solid material with the antisolvent comprises immersing the swollen solid material into the antisolvent.

14. The method according to claim 13, wherein the swollen solid material is immersed into the antisolvent for a time period of at least about 1 minute.

15. The method according to claim 1, wherein the antisolvent is selected from the group consisting of toluene, chloroform, and isopropyl alcohol (IPA).

16. The method according to claim 1, wherein the annealing is conducted at a temperature of at least about 25 degrees Celsius for a time period of at least about 0.5 hours.

17. The method according to claim 1, wherein the perovskite nanocrystals have the formula:

$ABX_3$, wherein A is an organic or inorganic cation;
wherein B is a metal cation; and
wherein X is a halide.

18. The method according to claim 17, wherein A is selected from the group consisting of Cs+, $CH_3NH_3^+(MA^+)$, and $CH(NH_2)_2^+(FA^+)$.

19. The method according to claim 17, wherein B is selected from the group consisting of $Ca^{2+}$, $Sr^{2+}$, $Cd^{2+}$, $Cu^{2+}$, $Ni^{2+}$, $Mn^{2+}$, $Fe^{2+}$, $Co^{2+}$, $Pd^{2+}$, $Ge^{2+}$, $Sn^{2+}$, $Pb^{2+}$, $Yb^{2+}$, and $Eu^{2+}$.

20. The method according to claim 17, wherein X is selected from the group consisting of $F^-$, $Cl^-$, $Br^-$, and $I^-$.

21. A perovskite-polymer composite comprising perovskite nanocrystals dispersed in a polymer matrix, wherein the polymer matrix comprises a polymeric material comprises poly(ethylene terephthalate) (PET), and wherein the perovskite nanocrystals have the formula:

$ABX_3$, wherein A is an organic or inorganic cation;
wherein B is a metal cation;
wherein X is a halide; and
wherein the perovskite nanocrystals have an average size of from about 5 nm to about 20 nm.

22. The perovskite-polymer composite according to claim 21, wherein A is selected from the group consisting of $Cs^+$, $CH_3NH_3^+(MA^+)$, and $CH(NH_2)_2^+(FA^+)$.

23. The perovskite-polymer composite according to claim 21, wherein B is selected from the group consisting of $Ca^{2+}$, $Sr^{2+}$, $Cd^{2+}$, $Cu^{2+}$, $Ni^{2+}$, $Mn^{2+}$, $Fe^{2+}$, $Co^{2+}$, $Pd^{2+}$, $Ge^{2+}$, $Sn^{2+}$, $Pb^{2+}$, $Yb^{2+}$, and $Eu^{2+}$.

24. The perovskite-polymer composite according to claim 21, wherein X is selected from the group consisting of $F^-$, $Cl^-$, $Br^-$, and $I^-$.

25. The perovskite-polymer composite according to claim 21, wherein the perovskite nanocrystals comprise $CsPbBr_3$.

* * * * *